United States Patent
Ang et al.

(10) Patent No.: US 9,521,562 B2
(45) Date of Patent: Dec. 13, 2016

(54) DECOUPLING RADIO FREQUENCY (RF) AND BASEBAND PROCESSING

(71) Applicant: QUALCOMM Incorporated, San Diego, CA (US)

(72) Inventors: Peter Pui Lok Ang, San Diego, CA (US); Joseph Patrick Burke, Glenview, IL (US); Tingfang Ji, San Diego, CA (US); Naga Bhushan, San Diego, CA (US); Krishna Kiran Mukkavilli, San Diego, CA (US); Michael Alexander Howard, Cardiff, CA (US); John Edward Smee, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 14/637,163

(22) Filed: Mar. 3, 2015

(65) Prior Publication Data

US 2016/0112885 A1  Apr. 21, 2016

Related U.S. Application Data

(60) Provisional application No. 62/064,781, filed on Oct. 16, 2014.

(51) Int. Cl.

| | |
|---|---|
| *H04W 24/02* | (2009.01) |
| *H04W 52/26* | (2009.01) |
| *H04L 25/02* | (2006.01) |
| *H04L 12/861* | (2013.01) |
| *H04W 52/02* | (2009.01) |

(52) U.S. Cl.
CPC .......... *H04W 24/02* (2013.01); *H04L 25/0262* (2013.01); *H04L 49/9047* (2013.01); *H04W 52/028* (2013.01); *H04W 52/267* (2013.01)

(58) Field of Classification Search
CPC . H04L 25/0262; H04L 49/9047; H04W 24/02; H04W 52/267
(Continued)

(56) References Cited

U.S. PATENT DOCUMENTS

| | | | |
|---|---|---|---|
| 5,530,695 A * | 6/1996 | Dighe | H04L 12/5602 370/232 |
| 8,462,684 B1 * | 6/2013 | Kopikare | H04W 52/267 370/311 |

(Continued)

FOREIGN PATENT DOCUMENTS

| | | |
|---|---|---|
| WO | WO-2005022761 A1 | 3/2005 |
| WO | WO-2012166887 A2 | 12/2012 |

OTHER PUBLICATIONS

ISA/EPO, International Search Report and Written Opinion of the International Searching Authority, Int'l Appl. No. PCT/US2015/054118, Jan. 18, 2016, European Patent Office, Rijswijk, NL, 11 pgs.

*Primary Examiner* — Stephen J Clawson
(74) *Attorney, Agent, or Firm* — Holland & Hart LLP

(57) ABSTRACT

Methods, systems, and devices are described for wireless communication. A first device, such as a user equipment (UE) may be configured with a peak data rate that corresponds to the radio frequency (RF) capacity of a modem and a sustained data rate that corresponds to the baseband capacity. The first device may receive a set of data blocks during a transmission burst from a second device. The quantity of data blocks in the burst may be based on the peak data rate. The first device may store time domain samples or frequency tones for the data and then power down the RF components for an interval based on how long it will take to process the data. The first device may then process the data at the sustained data rate. After the rest interval, the first (Continued)

device may power up the RF components and receive another burst of data.

30 Claims, 19 Drawing Sheets

(58) Field of Classification Search
USPC .......................................................... 370/328
See application file for complete search history.

(56) References Cited

U.S. PATENT DOCUMENTS

| | | |
|---|---|---|
| 8,804,633 B2 | 8/2014 | Kuo |
| 8,855,095 B2 | 10/2014 | Tseng |
| 2003/0037159 A1* | 2/2003 | Zhao .................... H04L 47/20 709/232 |
| 2006/0002383 A1* | 1/2006 | Jeong .................... H04L 12/10 370/360 |
| 2007/0026839 A1 | 2/2007 | Liang et al. |
| 2008/0141265 A1* | 6/2008 | Choi .................... G06F 1/3203 718/105 |
| 2008/0175203 A1* | 7/2008 | Jen ...................... H04L 1/0041 370/331 |
| 2013/0121172 A1* | 5/2013 | Cheng ............... H04W 52/0222 370/252 |
| 2013/0331954 A1 | 12/2013 | McConnell et al. |
| 2014/0023071 A1* | 1/2014 | Park .................. H04L 29/06482 370/389 |
| 2014/0192740 A1 | 7/2014 | Ekpenyong et al. |
| 2014/0313993 A1 | 10/2014 | Tabet et al. |

* cited by examiner

DECOUPLING RADIO FREQUENCY (RF) AND BASEBAND PROCESSING

CROSS REFERENCES

The present application for patent claims priority to U.S. Provisional Patent Application No. 62/064,781 by Ang et al., entitled "Decoupling Radio Frequency (RF) And Baseband Processing," filed Oct. 16, 2014, assigned to the assignee hereof, and expressly incorporated by reference herein.

BACKGROUND

Field of Disclosure

The following relates generally to wireless communication, and more specifically to decoupling radio frequency and baseband processing.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

By way of example, a wireless multiple-access communications system may include a number of base stations, each simultaneously supporting communication for multiple communication devices, which may be otherwise known as user equipment (UEs). A base station may communicate with UEs on downlink channels (e.g., for transmissions from a base station to a UE) and uplink channels (e.g., for transmissions from a UE to a base station).

A device may receive signals within a radio frequency (RF) range and then convert the signal to a baseband signal. In some cases, it may be more efficient to increase the capacity of the RF components of a modem than to scale up the baseband processing capacity. However, if the RF front end of a modem receives more data than can be promptly processed by the baseband components, the data may be dropped. This may result in reduced quality of service for the user.

SUMMARY

The present disclosure may relate generally to wireless communications systems, and more particularly to improved systems, methods, or apparatuses for decoupling radio frequency and baseband processing. A first device, such as a user equipment (UE), may be configured with a peak data rate that corresponds to the receiving capacity of a radio frequency (RF) portion of a modem and a sustained data rate that corresponds to the receiving capacity of the baseband components. The first device may receive a set of data blocks during a transmission burst from a second device, such as a base station or another UE. The quantity of data blocks in the burst may be based on the peak data rate. The first device may store time domain samples or frequency tones for the data and then power down the RF components for a rest interval based on how long it will take to process the data. The first device may then process the data at the sustained data rate. After the rest interval, the first device may power up the RF components and receive another burst of data.

A method of wireless communication at a first device is described. The method may include receiving a set of data blocks during a first interval from a second device, wherein a quantity of the set of data blocks is based on a peak data rate of a modem and a size of each data block in the set of data blocks is based on a sustained data rate of the modem; powering down one or more RF components of the modem during a second interval following the first interval, wherein a length of the second interval is based on one or more parameters from a group consisting of the peak data rate, the sustained data rate, and a memory buffer capacity, and processing the set of data blocks during the second interval based on the sustained data rate.

An apparatus for wireless communication at a first device is described. The apparatus may include means for receiving a set of data blocks during a first interval from a second device, wherein a quantity of the set of data blocks is based on a peak data rate of a modem and a size of each data block in the set of data blocks is based on a sustained data rate of the modem, means for powering down one or more RF components of the modem during a second interval following the first interval, wherein a length of the second interval is based on one or more parameters from a group consisting of the peak data rate, the sustained data rate, and a memory buffer capacity, and means for processing the set of data blocks during the second interval based on the sustained data rate.

A further apparatus for wireless communication at a first device is described. The apparatus may include a processor and a memory coupled to the processor. The processor may be configured to receive a set of data blocks during a first interval from a second device, wherein a quantity of the set of data blocks is based on a peak data rate of a modem and a size of each data block in the set of data blocks is based on a sustained data rate of the modem; power down one or more RF components of the modem during a second interval following the first interval, wherein a length of the second interval is based on one or more parameters from a group consisting of the peak data rate, the sustained data rate, and a memory buffer capacity; and process the set of data blocks during the second interval based on the sustained data rate.

A non-transitory computer-readable medium for storing instructions executable by a processor is described. The instructions may include instructions to receive a set of data blocks during a first interval from a second device, wherein a quantity of the set of data blocks is based on a peak data rate of a modem and a size of each data block in the set of data blocks is based on a sustained data rate of the modem; instructions to power down one or more RF components of the modem during a second interval following the first interval, wherein a length of the second interval is based on one or more parameters from a group consisting of the peak data rate, the sustained data rate, and a memory buffer capacity; and instructions to process the set of data blocks during the second interval based on the sustained data rate.

Some examples of the method, apparatuses, or non-transitory computer-readable medium described above may further include storing the set of data blocks in a memory buffer. Additionally or alternatively, in some examples storing the set of data blocks comprises storing a set of time domain samples or frequency tones corresponding to the set of data blocks in the memory buffer, wherein the memory buffer is a component of an RF front end of the modem, and wherein the memory buffer capacity is based on the memory buffer.

In some examples of the method, apparatuses, or non-transitory computer-readable medium described above, processing the set of data blocks comprises retrieving each data block from the memory buffer according to an ordering of the set of data blocks and processing each data block from the set of data blocks in a baseband portion of the modem based on the ordering. Additionally or alternatively, some examples may include sending a message to the second device indicating the one or more parameters. Some examples may include receiving a configuration message from the second device indicating the length of the second interval.

In some examples of the method, apparatuses, or non-transitory computer-readable medium described above, sending the message to the second device comprises indicating a UE category to the second device, wherein the UE category is associated with the one or more parameters. Additionally or alternatively, some examples may include calculating the length of the second interval based on the one or more parameters.

In some examples of the method, apparatuses, or non-transitory computer-readable medium described above, calculating the length of the second interval comprises subtracting a length of the first interval from the product of the length of the first interval and the quotient of the peak data rate and the sustained data rate. Additionally or alternatively, some examples may include sending a message to the second device indicating a scheduling backoff period corresponding to the second interval.

Some examples of the method, apparatuses, or non-transitory computer-readable medium described above may further include refraining from sending an acknowledgement (ACK) to the second device for a period corresponding to the second interval. Additionally or alternatively, in some examples an RF capacity of the modem is based on wideband reception.

In some examples of the method, apparatuses, or non-transitory computer-readable medium described above, the peak data rate is greater than the sustained data rate. Additionally or alternatively, in some examples the first interval is a transmission time interval (TTI).

In some examples of the method, apparatuses, or non-transitory computer-readable medium described above, the peak data rate is based on an RF capacity of the modem. Additionally or alternatively, in some examples the sustained data rate is based on a baseband capacity of the modem.

A method of wireless communication at a second device is described. The method may include receiving a message indicating a peak data rate and a sustained data rate of a first device, transmitting a set of data blocks to the first device based on the peak data rate, determining a second interval based on one or more parameters from a group consisting of the peak data rate, the sustained data rate, and a memory buffer capacity, and refraining from transmitting to the first device during the second interval.

An apparatus for wireless communication at a second device is described. The apparatus may include means for receiving a message indicating a peak data rate and a sustained data rate of a first device, means for transmitting a set of data blocks to the first device based on the peak data rate, means for determining a second interval based on one or more parameters from a group consisting of the peak data rate, the sustained data rate, and a memory buffer capacity, and means for refraining from transmitting to the first device during the second interval.

A further apparatus for wireless communication at a second device is described. The apparatus may include a processor and a memory coupled to the processor. The processor may be configured to receive a message indicating a peak data rate and a sustained data rate of a first device, transmit a set of data blocks to the first device based on the peak data rate; determine a second interval based on one or more parameters from a group consisting of the peak data rate, the sustained data rate, and a memory buffer capacity; and refrain from transmitting to the first device during the second interval.

A non-transitory computer-readable medium for storing instructions executable by a processor at a second device is described. The instructions may include instructions to receive a message indicating a peak data rate and a sustained data rate of a first device; instructions to transmit a set of data blocks to the first device based on the peak data rate; instructions to determine a second interval based on one or more parameters from a group consisting of the peak data rate, the sustained data rate, and a memory buffer capacity; and instructions to refrain from transmitting to the first device during the second interval.

In some examples, the method, apparatuses, or non-transitory computer-readable medium described above may include receiving a message from the first device indicating the one or more parameters. Some examples may include transmitting a configuration message to the first device indicating a length of the second interval.

In some examples of the method, apparatuses, or non-transitory computer-readable medium described above, receiving the message from the first device comprises indicating a UE category from the first device, wherein the UE category is associated with the one or more parameters. Additionally or alternatively, some examples may include calculating a length of the second interval based on the one or more parameters.

In some examples of the method, apparatuses, or non-transitory computer-readable medium described above, calculating the length of the second interval comprises subtracting a length of the first interval from the product of the length of the first interval and the quotient of the peak data rate and the sustained data rate. Additionally or alternatively, some examples may include receiving a message from the first device indicating a scheduling backoff period corresponding to the second interval.

Some examples of the method, apparatuses, or non-transitory computer-readable medium described above, the RF capacity of the modem is based on wideband reception.

In some examples of the method, apparatuses, or non-transitory computer-readable medium described above, the peak data rate is greater than the sustained data rate.

In some examples of the method, apparatuses, or non-transitory computer-readable medium described above, the peak data rate is based on an RF capacity of the modem. Additionally or alternatively, in some examples the sustained data rate is based on a baseband capacity of the modem.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
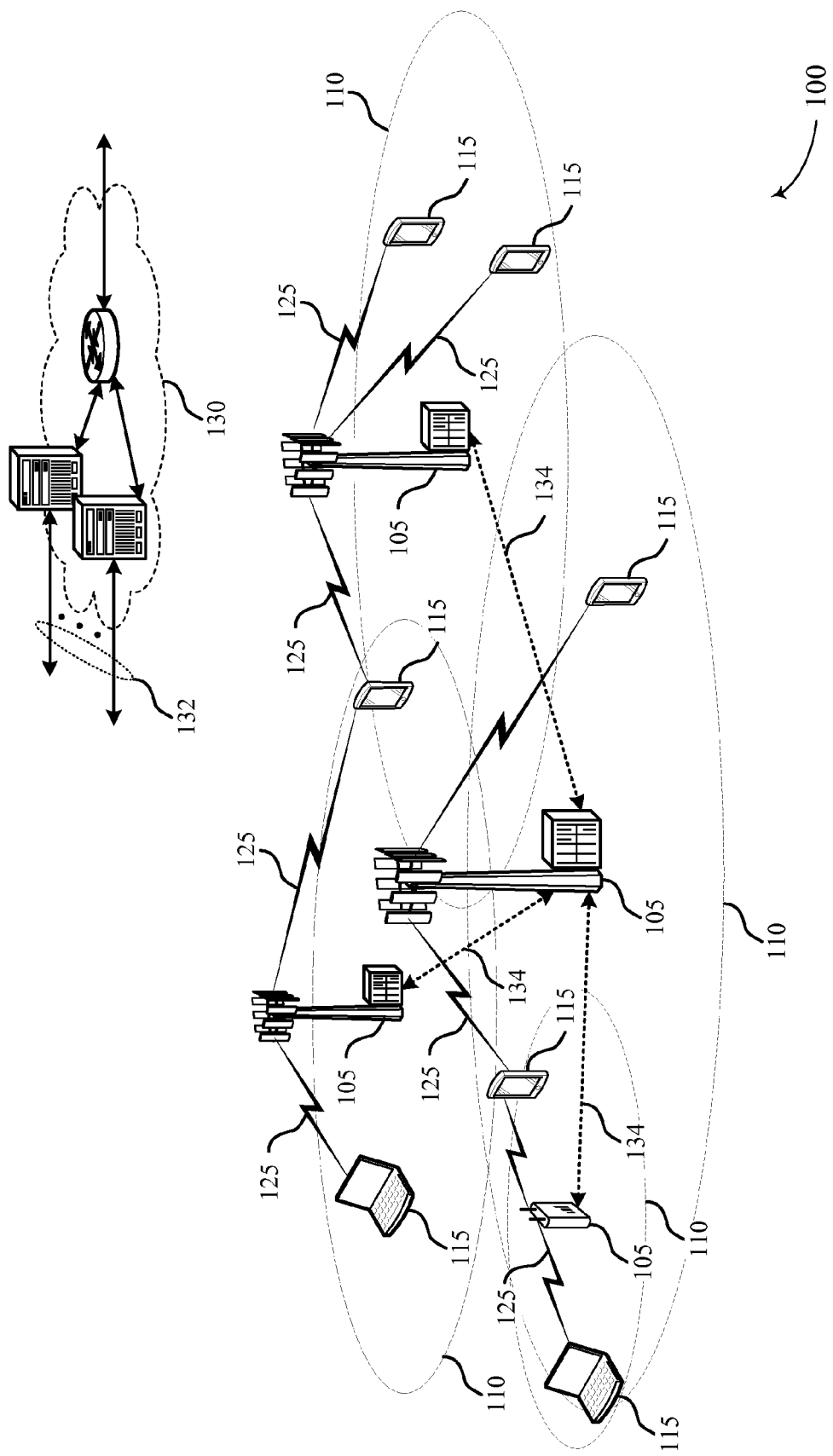
FIG. 1 illustrates an example of a wireless communications system for decoupling radio frequency and baseband processing in accordance with various aspects of the present disclosure.

The described features generally relate to improved systems, methods, or apparatuses for decoupling radio frequency and baseband processing. A first device, such as a user equipment (UE), may be configured with a peak data rate that corresponds to the capacity of a radio frequency (RF) portion of a modem and a sustained data rate that corresponds to the capacity of the baseband components. The first device may receive a set of data blocks during a transmission burst from a second device, such as a base station, another UE, or a peer-to-peer device. The quantity of data blocks in the burst may be based on the peak data rate. The first device may store time domain samples or frequency tones for the data and then power down the RF components for an interval based on how long it will take to process the data. The first device may then process the data at the sustained data rate. After the rest interval, the first device may power up the RF components and receive another burst of data.

In some cases, it may be more efficient to increase the capacity of the RF components of a modem than to scale up the baseband processing capacity. Alternatively, it may be more efficient to produce a low cost/low complexity modem by reducing the baseband processing capacity. For example, power consumption or complexity may increase at a sub linear rate with an increase in RF capacity (e.g., the received frequency range).

Thus, the first device may be designed in a manner that has a greater RF component capacity than baseband capacity. In some cases, processing time may depend largely on HARQ or timing advance deadlines. In accordance with the present disclosure, a modem architecture may be designed around time intensive processing stages to enable pipelining of processing tasks. That is, different processor components may operate in an assembly line manner, processing different data blocks at different stages simultaneously. Such a first device may receive more data than can be promptly processed by the baseband components, but rather than dropping the data the first device may store the data and process it according to the baseband processing capacity while the RF components are turned off (or set to a reduced power mode). This may enable the first device to take advantage of the efficiencies of wideband RF operation and to save power by turning off the RF components while the data is being processed by the baseband components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

For the sake of clarity, the following description focuses primarily on examples in which a UE is the first device (i.e., the device receiving a burst transmission) and a cellular base station is the second device (i.e., the device transmitting a burst transmission). Nevertheless, it will be understood that the principles of the present disclosure may be applied to transmissions between other types of devices, including transmissions between two UEs or peer-to-peer clients, transmissions between two wireless local area network (WLAN) stations or between a WLAN station and a WLAN AP, transmissions between a host device and a peripheral, and wireless transmissions between other types of devices.

FIG. 1 illustrates an example of a wireless communications system 100 in accordance with various aspects of the present disclosure. The wireless communications system 100 includes base stations 105, at least one UE 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro or small cell base stations). There may be overlapping geographic coverage areas 110 for different technologies.

In some examples, the wireless communications system 100 is a Long Term Evolution (LTE)/LTE-Advanced (LTE-A) network. In LTE/LTE-A networks, the term evolved node B (eNB) may be generally used to describe the base stations 105, while the term UE may be generally used to describe the UEs 115. The wireless communications system 100 may be a heterogeneous LTE/LTE-A network in which different types of eNBs provide coverage for various geographical regions. For example, each eNB or base station 105 may provide communication coverage for a macro cell, a small cell, or other types of cells. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or packet data convergence protocol (PDCP) layer may be IP-based. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARD) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In some embodiments of the wireless communications system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

A user equipment (UE) may be configured with a peak data rate that corresponds to the capacity of a radio frequency (RF) portion of a modem and a sustained data rate that corresponds to the capacity of the baseband components. The UE may receive a set of data blocks during a transmission burst from a base station. The quantity of data blocks in the burst may be based on the peak data rate. The UE may store time domain samples or frequency tones for the data and then power down the RF components for a rest interval based on how long it will take to process the data. The UE may then process the data at the sustained data rate. After the rest interval, the UE may power up the RF components and receive another burst of data.

LTE systems may utilize orthogonal frequency division multiple access (OFDMA) on the DL and single carrier frequency division multiple access (SC-FDMA) on the UL. OFDMA and SC-FDMA partition the system bandwidth into multiple (K) orthogonal subcarriers, which are also commonly referred to as tones or bins. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guardband) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands. In some cases, a UE 115 may be capable of receiving data over multiple carriers simultaneously (e.g., more than one 20 MHz carrier).

Time intervals in LTE may be expressed in multiples of a basic time unit (e.g., the sampling period, $T_s=1/30,720,000$ seconds). Time resources may be organized according to radio frames of length of 10 ms ($T_f=307200 \cdot T_s$), which may be identified by a system frame number (SFN) ranging from 0 to 1023. Each frame may include ten 1 ms subframes numbered from 0 to 9. The subframe may be the smallest scheduling unit in LTE, and may also be referred to as a transmission time interval (TTI). A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods.

A resource element may consist of one symbol period and one subcarrier. A resource block may contain 12 consecutive subcarriers in the frequency domain and one slot in the time domain. The number of bits carried by each resource element may depend on the modulation scheme (the configuration of symbols that may be selected during each symbol period). Thus, the more resource blocks that a UE 115 receives and the higher the modulation scheme, the higher the data rate. A base station may transmit one unit of data, known as a transport block, during each TTI (e.g., in each subframe).

each transport block may correspond to a single MAC layer protocol data unit (PDU). The amount of data in a transport block can vary based on the modulation scheme and also in the number of resource blocks used. For example, a 20 MHz carrier may have 100 resource blocks available.

According to the present disclosure, a UE 115 may be configured with a peak data rate that corresponds to the capacity of an RF portion of a modem and a sustained data rate that corresponds to the capacity of the baseband components. The UE 115 may receive a set of data blocks (e.g., transport blocks or MAC PDUs) during a transmission burst from a base station. In some examples, the data blocks may be received on separate carriers according to a wideband transmission scheme. The quantity of data blocks in the burst may be based on the peak data rate. The UE 115 may store time domain samples or frequency tones for the data and then power down the RF components for a rest interval based on how long it will take to process the data. The UE 115 may then process the data at the sustained data rate. After the rest interval, the UE 115 may power up the RF components and receive another burst of data.

Figure 2:
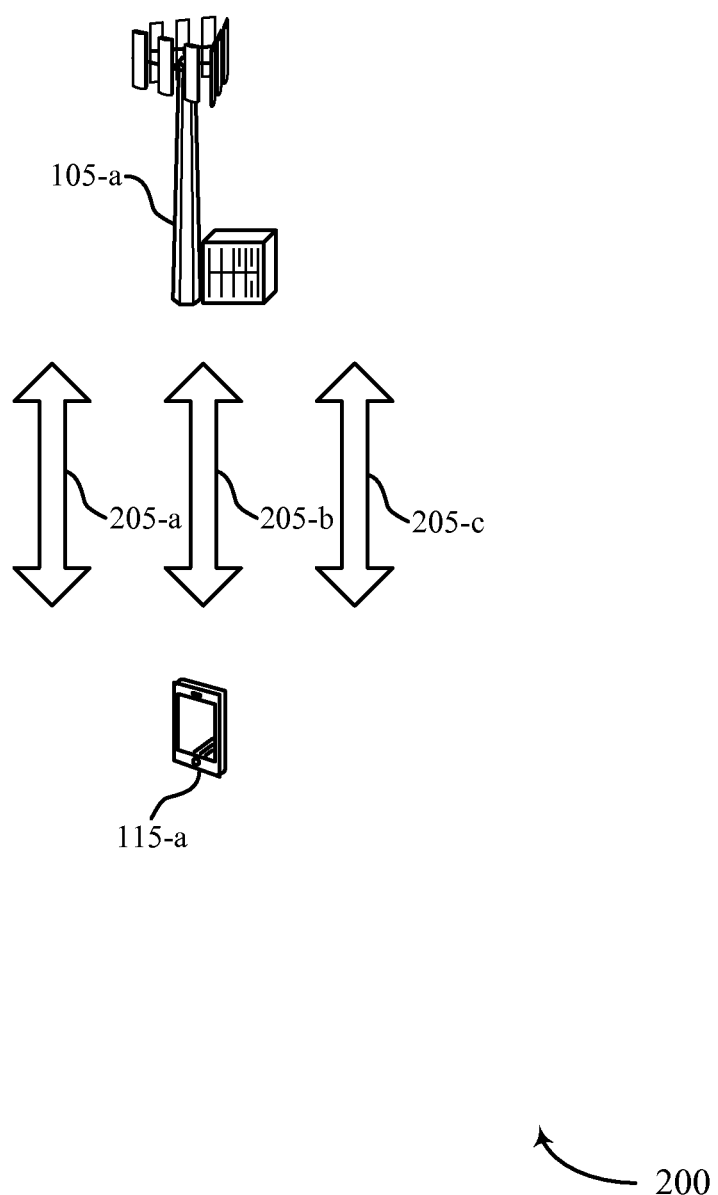
FIG. 2 illustrates an example of a wireless communications subsystem for decoupling radio frequency and baseband processing in accordance with various aspects of the present disclosure.

FIG. 2 illustrates an example of a wireless communications subsystem 200 for decoupling radio frequency and baseband processing in accordance with various aspects of the present disclosure. Wireless communications subsystem 200 may include a UE 115-a, which may be an example of a UE 115 described above with reference to FIG. 1. UE 115-a may also be an example of a first device. Wireless communications subsystem 200 may also include a base station 105-a, which may be an example of a base station 105 described above with reference to FIG. 1 and may also be an example of a second device. Wireless communications subsystem 200 may illustrate an example, in which data is transmitted from base station 105-*a* to UE 115-*a* using multiple carriers 205-*a*, 205-*b*, and 205-*c*. In some cases, more than three or fewer than three carriers 205 may be used. In other cases, multiple data blocks may be transmitted over a single wideband carrier (e.g., greater than 20 MHz).

Thus, UE 115-*a* may have the capacity to receive multiple data blocks over carriers 205-*a*, 205-*b*, and 205-*c*, but UE 115-*a* may not have the baseband processing capacity to decode each of the data blocks simultaneously. Thus, UE 115-*a* may be configured with a peak data rate that corresponds to the capacity of the RF portion of a modem (e.g., to receive data over multiple carriers) and a sustained data rate that corresponds to the capacity of the baseband components. UE 115-*a* may receive a set of data blocks during a transmission burst from a base station over each of the carriers 205. The quantity of data blocks in the burst (or the number of carriers 205 used) may be based on the peak data rate. UE 115-*a* may store time domain samples or frequency tones for the data and then power down the RF components for an interval based on how long it will take to process the data. UE 115-*a* may then process the data at the sustained data rate. After the rest interval, UE 115-*a* may power up the RF components and receive another burst of data over carriers 205-*a*, 205-*b* and 205-*c*.

Figure 3:
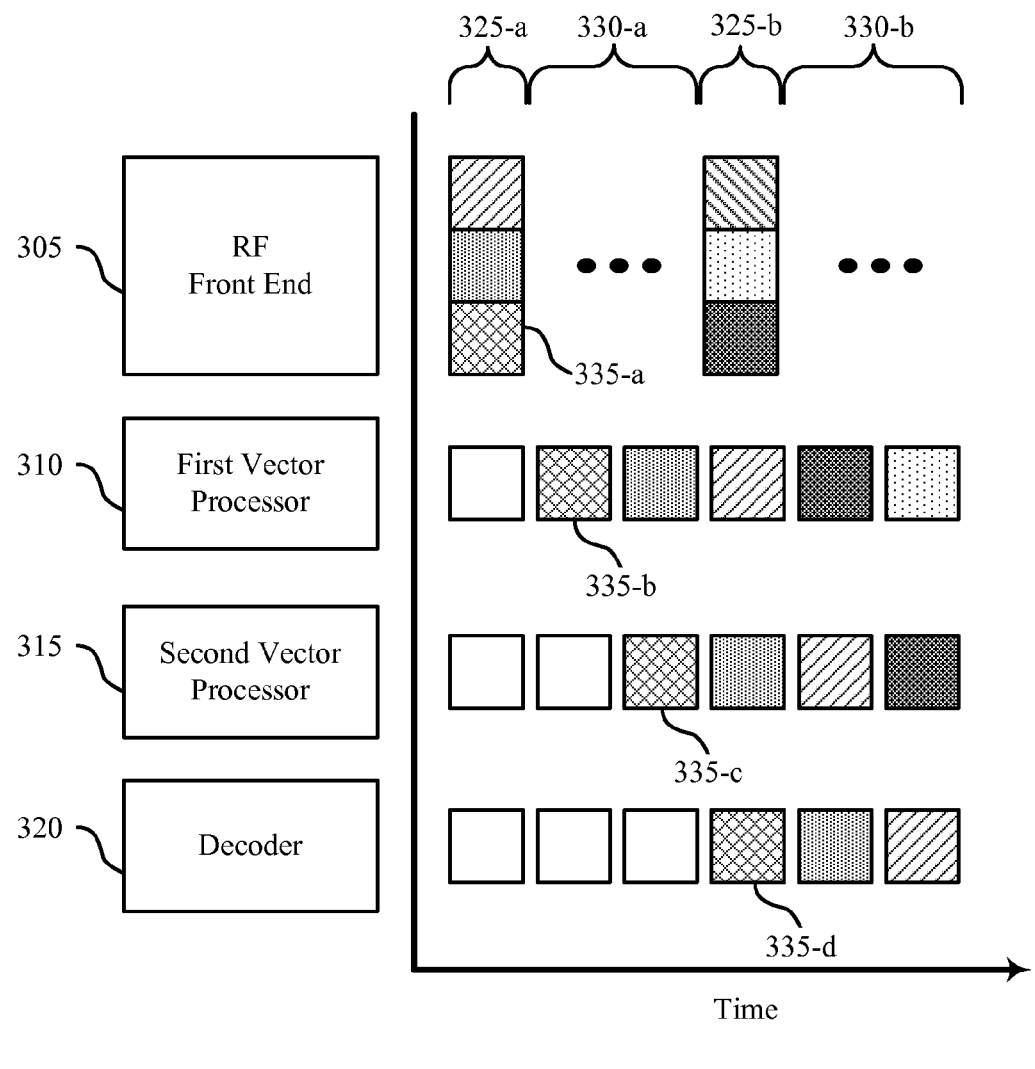
FIG. 3 illustrates an example of a data processing sequence for decoupling radio frequency and baseband processing in accordance with various aspects of the present disclosure.

FIG. 3 illustrates an example of a data processing sequence 300 for decoupling radio frequency and baseband processing in accordance with various aspects of the present disclosure. Data processing sequence 300 may illustrate processing done by one or more modem components that may be a part of a transceiver of a UE 115 (which may be an example of a first device) as described above with reference to FIGS. 1-2. The components depicted as performing the data processing sequence 300 may represent processing time units, and may not correspond to separate modem components. Thus, data processing sequence shows RF front end 305, first vector processor 310, second vector processor 315, and decoder 320 as an illustration of the processing done by RF and baseband portions of a modem.

A UE 115 may power up the RF front end 305 during high power period 325-*a* to receive a data burst including multiple data blocks such as data block 335-*a*. Each data block may be received over a separate carrier, or all of them may be received on the same carrier. The number of data blocks may depend on the capacity of RF front end 305. In some cases, the high power period 325-*a* may last for one TTI.

After receiving the data burst, the UE 115 may store the data in a memory buffer and power down RF front end 305 during a low power period 330-*a*. In some cases, the RF front end components are turned off. In other cases, one or more components are set to a low power state. Low power period 330-*a* may consist of multiple TTIs. For example, the number of TTIs may be one less than the number of data blocks received to provide sufficient time to process the data at a sustained rate based on the capacity of first vector processor 310, second vector processor 315, and decoder 320. For example, during the first TTI of low power period 330-*a*, the first vector processor 310 may process a single data block 335-*b* that corresponds to received data block 335-*a*. During the next TTI, the second vector processor 315 may process data block 335-*c* corresponding to data block 335-*a* and 335-*b*. At the same time, first vector processor 310 may process the next data block.

The UE 115 may then power up the RF front end 305 for a high power period 325-*b* to receive another data burst containing a new set of data blocks. At the same time, decoder 320 may finish processing data block 335-*d* and pass the data on to higher layers. First vector processor may begin processing the final data block received during high power period 325-*a*. The UE 115 may then power down RF front end 305 and begin to process the data blocks received during high power period 325-*b* for the low power period 330-*b*.

Though data processing sequence 300 depicts each processing stage taking one TTI, in practice each stage may take more or less than one TTI as long as the data blocks are processed in parallel such that the sustained data processing rate is sufficient to handle the total number of blocks received during each wideband data burst given the length of the low power time interval.

Thus, a UE 115 may be configured with a peak data rate that corresponds to the capacity of RF front end 305 and a sustained data rate that corresponds to the capacity of baseband components (e.g., components performing the role of first vector processor 310, second vector processor 315, and decoder 320). The UE 115 may receive a set of data blocks 335 during a high power period 325. The quantity of data blocks 335 in the burst may be based on the peak data rate. The UE 115 may store time domain samples or frequency tones for the data and power down the RF components for a low power period 330 based on how long it will take to process the data by the baseband components. First vector processor 310, second vector processor 315 and decoder 320 may then process the data at the sustained data rate (e.g., one data block 335 per TTI). After each low power period 330, the UE 115 may power up the RF front end 305 and receive another data burst.

Figure 4:
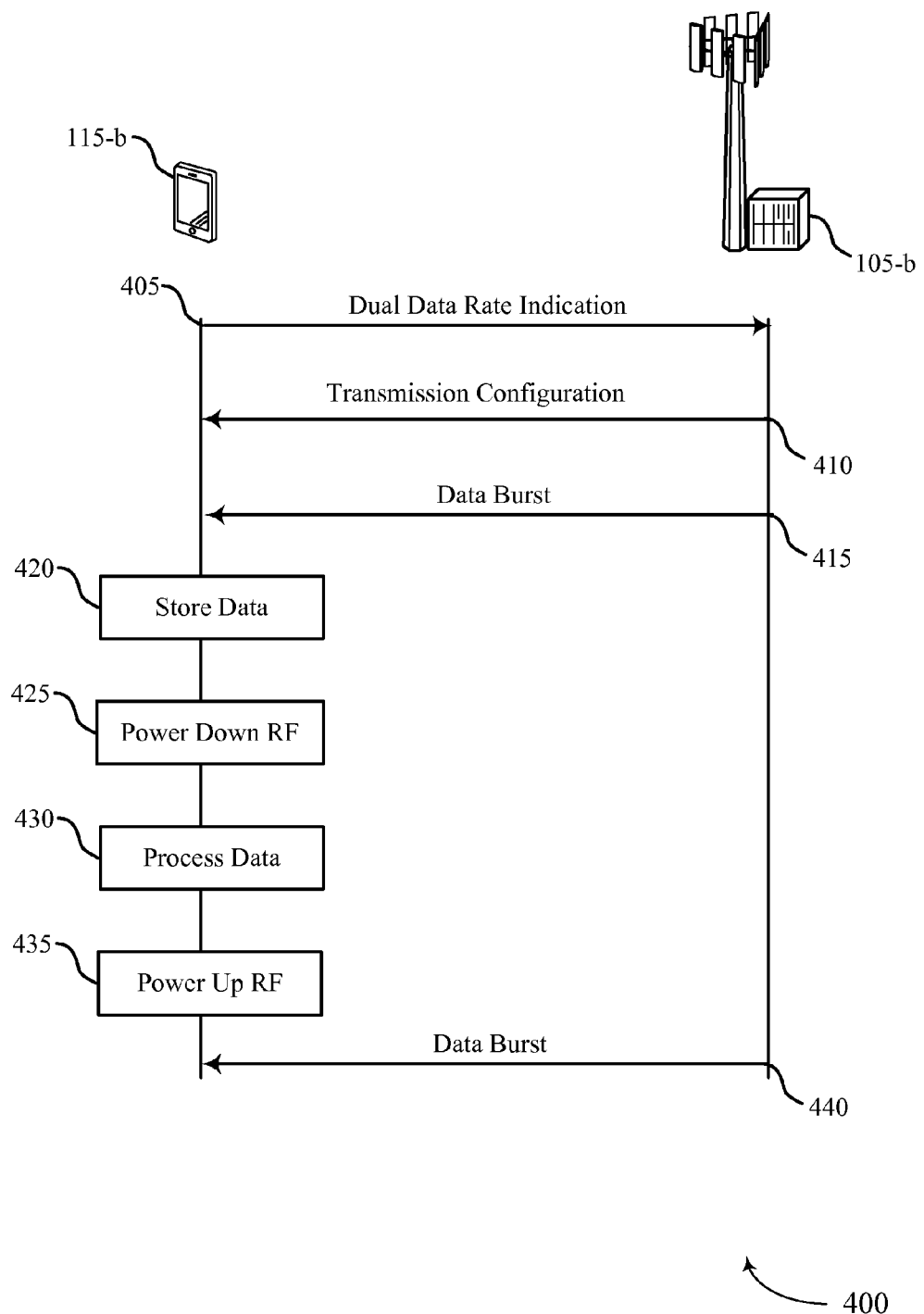
FIG. 4 illustrates an example of a process flow for decoupling radio frequency and baseband processing in accordance with various aspects of the present disclosure.

FIG. 4 illustrates an example of a process flow 400 for decoupling radio frequency and baseband processing in accordance with various aspects of the present disclosure. Process flow 400 may include a UE 115-*b*, which may be an example of a UE 115 described above with reference to FIGS. 1-3, and may also be an example of a first device. Process flow 400 may also include a base station 105-*b*, which may be an example of a base station 105 described above with reference to FIGS. 1-2 and may also be an example of a second device. In some examples (not shown), UE 115-*b* may decouple baseband and RF signal processing during communications with another UE 115 (e.g., in P2P operations) rather than in coordination with base station 105-*b* as illustrated. That is, in some cases both the first and second devices may be UEs 115.

At step 405, UE 115-*b* may send a message to base station 105-*b* indicating the peak data rate, the sustained data rate, or the memory buffer capacity. In some examples, sending the message to base station 105-*b* includes indicating a UE category to the base station 105-*b*. The UE category may be associated with a peak data rate and a sustained data rate. In some examples, UE 115-*b* may indicate the data rates in terms of a number of data bits per TTI. UE 115-*b* may transmit the peak data rate that may be supported. However, in some cases base station 105-*b* may select a peak data rate for transmission that is different from the supported peak data rate indicated by UE 115-*b*. Similarly, base station 105-*b* may select a sustained data rate for transmission that is different than the sustained data rate that UE 115-*b* is capable of supporting.

In other examples (not shown), UE 115-*b* may not explicitly indicate both data rates to base station 105-*b*, but may decouple radio frequency and baseband processing in a manner transparent to base station 105-*b*. For example, UE 115-*b* may refrain from sending one or more acknowledgements (ACKs) to base station 105-*b* to prevent base station 105-*b* from transmitting new data blocks during a low power interval for processing the received data.

At step 410, UE 115-*a* may receive a configuration message from base station 105-*b*. The configuration message may be based on the peak rate (either the rate transmitted by UE 115-*b* or a different peak rate selected by base station 105-*b*) and the sustained rate. For example, the sustained data rate may determine the size of each data block that base station 105-*b* may transmit, and the peak data rate may determine how many data blocks may be transmitted simultaneously in a data burst. In some cases, the configuration message may indicate the length of a low power interval (e.g., a number of TTIs) that UE 115-*b* may power down RF components (i.e., how long base station 105-*b* will refrain from transmitting) after a data burst. In some cases the configuration may indicate a persistent configuration, and in other cases the configuration information may apply to a finite number of transmissions (e.g., a single transmission). In some cases, UE 115-*b* may send a message to base station 105-*b* indicating a scheduling backoff period corresponding to the low power interval. In some cases, the transmission gap may be based on a HARQ process limit of UE 115-*b*.

In some cases, UE 115-*b*, base station 105-*b* or both may calculate the length of a second interval (i.e., the rest interval) based on the peak data rate, the sustained data rate, or the memory buffer capacity. For example, the length of the second interval may be calculated by subtracting a length of the first interval from the product of the length of the first interval and the quotient of the peak data rate and the sustained data rate:

$$T_R = \left(\frac{R_P}{R_S} - 1\right) T_{TTI},$$

where $T_R$ is the rest period following the burst, $R_P$ is the peak data rate, $R_S$ is the sustained data rate, and $T_{TTI}$ is the length of a single TTI.

At step 415, UE 115-*b* may receive a set of data blocks during a first interval (e.g., TTI). At step 420, UE 115-*b* may store the set of data blocks in a memory buffer. For example, UE 115-*b* may store a set of time domain samples or frequency tones corresponding to the set of data blocks in a memory buffer, wherein the memory buffer in the RF front end of a modem.

At step 425, UE 115-*b* may power down one or more RF components of the modem during a low power interval following the reception interval. At step 430, UE 115-*b* may then process the set of data blocks during the second interval (i.e., the rest interval) based on the sustained data rate. In some examples processing the set of data blocks may include retrieving each data block from the set of data blocks from the memory buffer in a predetermined order and processing each data block in a baseband portion of the modem based on the ordering.

At step 435, at the end of the low power interval for processing the received data, UE 115-*b* may power up the RF components in preparation for receiving a new data burst. Then, at step 440, base station 105-*b* may transmit a new burst of data.

Figure 5:
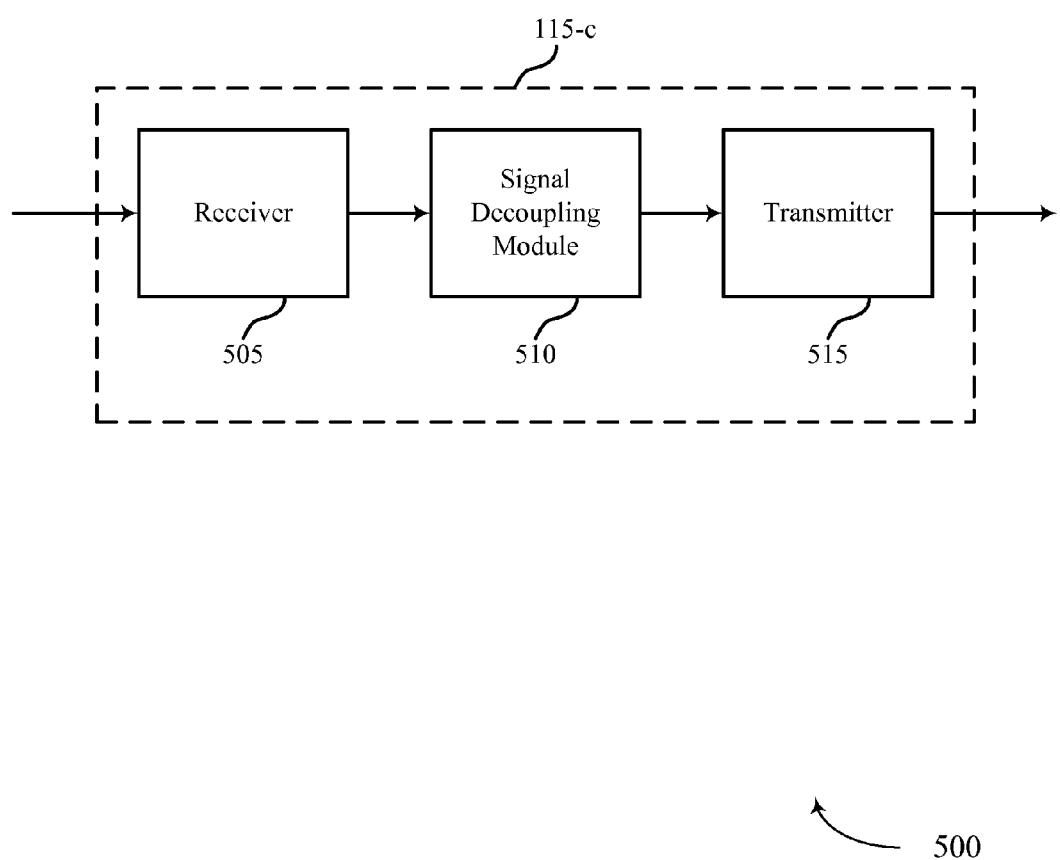
FIG. 5 shows a block diagram of a user equipment (UE) configured for decoupling radio frequency and baseband processing in accordance with various aspects of the present disclosure.

FIG. 5 shows a block diagram 500 of a UE 115-*c* configured for decoupling radio frequency and baseband processing in accordance with various aspects of the present disclosure. UE 115-*c* may be an example of aspects of a UE 115 described with reference to FIGS. 1-4. UE 115-*c* may include a receiver 505, a signal decoupling module 510, or a transmitter 515. UE 115-*c* may also include a processor. Each of these components may be in communication with each other. In some embodiments, the transmitter 515 may be collocated with the receiver 505 in a transceiver module. Receiver 505 or a combined transceiver module may include modem components for processing data blocks in coordination with signal decoupling module 510 as described above with reference to FIG. 3.

The components of UE 115-*c* may, individually or collectively, be implemented with at least one application specific integrated circuit (ASIC) adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

The receiver 505 may receive information such as packets, user data, or control information associated with various information channels (e.g., control channels, data channels, and information related to decoupling radio frequency and baseband processing, etc.). Information may be passed on to the signal decoupling module 510, and to other components of UE 115-*c*. In some examples, the receiver 505 may receive a configuration message from the base station indicating the length of the second interval.

The signal decoupling module 510 may receive a set of data blocks during a first interval, wherein a quantity of the set of data blocks is based on a peak data rate of a modem and a size of each data block in the set of data blocks is based on a sustained data rate of the modem; power down one or more RF components of the modem during a second interval following the first interval, wherein the length of the second interval is based on one or more parameters including the peak data rate, the sustained data rate, or a memory buffer capacity; and process the set of data blocks during the second interval based on the sustained data rate.

The transmitter 515 may transmit signals received from other components of UE 115-*c*. The transmitter 515 may include a single antenna, or it may include a plurality of antennas. In some examples, the transmitter 515 may send a message to a base station indicating the peak data rate, the sustained data rate, or the memory buffer capacity. In some examples, the transmitter 515 may send a message to a base station 105 indicating a UE category to the base station 105, wherein the UE category is associated with the one or more parameters.

Figure 6:
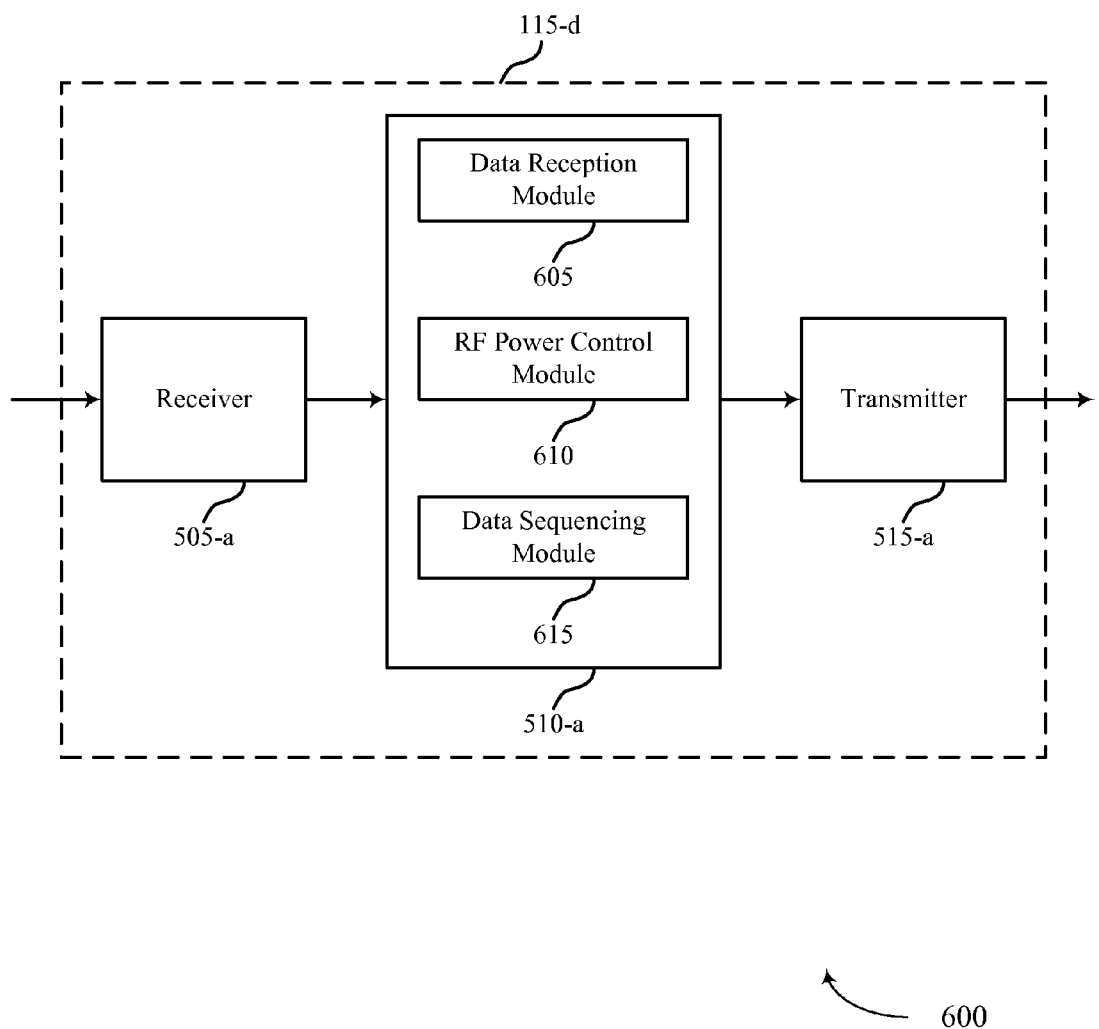
FIG. 6 shows a block diagram of a UE configured for decoupling radio frequency and baseband processing in accordance with various aspects of the present disclosure.

FIG. 6 shows a block diagram 600 of a UE 115-*d* for decoupling radio frequency and baseband processing in accordance with various aspects of the present disclosure. UE 115-*d* may be an example of aspects of a UE 115 described with reference to FIGS. 1-5, and may be an example of a first device. UE 115-*d* may include a receiver 505-*a*, a signal decoupling module 510-*a*, or a transmitter 515-*a*. UE 115-*d* may also include a processor. Each of these components may be in communication with each other. The signal decoupling module 510-*a* may also include a data reception module 605, a RF power control module 610, and a data sequencing module 615.

The components of UE 115-*d* may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The receiver 505-a may receive information which may be passed on to the signal decoupling module 510-a, and to other components of UE 115-d. The signal decoupling module 510-a may perform the operations described above with reference to FIG. 5. The transmitter 515-a may transmit signals received from other components of UE 115-d.

The data reception module 605 may receive a set of data blocks during a first interval, wherein a quantity of the set of data blocks is based on a peak data rate of a modem and a size of each data block in the set of data blocks is based on a sustained data rate of the modem as described above with reference to FIGS. 2-4. In some examples, the peak data rate may be greater than the sustained data rate. In some examples, the first interval may be a TTI. In some examples, the peak data rate may be based on an RF capacity of the modem. In some examples, the sustained data rate may be based on a baseband capacity of the modem.

The RF power control module 610 may power down one or more RF components of the modem during a second interval following the first interval, wherein the length of the second interval is based on one or more parameters including the peak data rate, the sustained data rate, or a memory buffer capacity as described above with reference to FIGS. 2-4. The RF power control module 610 may also calculate the length of the second interval based on one or more parameters including the peak data rate, the sustained data rate, or a memory buffer capacity as described above with reference to FIGS. 2-4. In some examples, calculating the length of the second interval comprises subtracting a length of the first interval from the product of the length of the first interval and the quotient of the peak data rate and the sustained data rate.

The data sequencing module 615 may process the set of data blocks (in coordination with the modem) during the second interval based on the sustained data rate as described above with reference to FIGS. 2-4. In some examples, processing the set of data blocks comprises retrieving each data block from the set of data blocks one by one from the memory buffer according to an ordering of the set of data blocks and processing each data block from the set of data blocks in a baseband portion of the modem based on the ordering.

Figure 7:
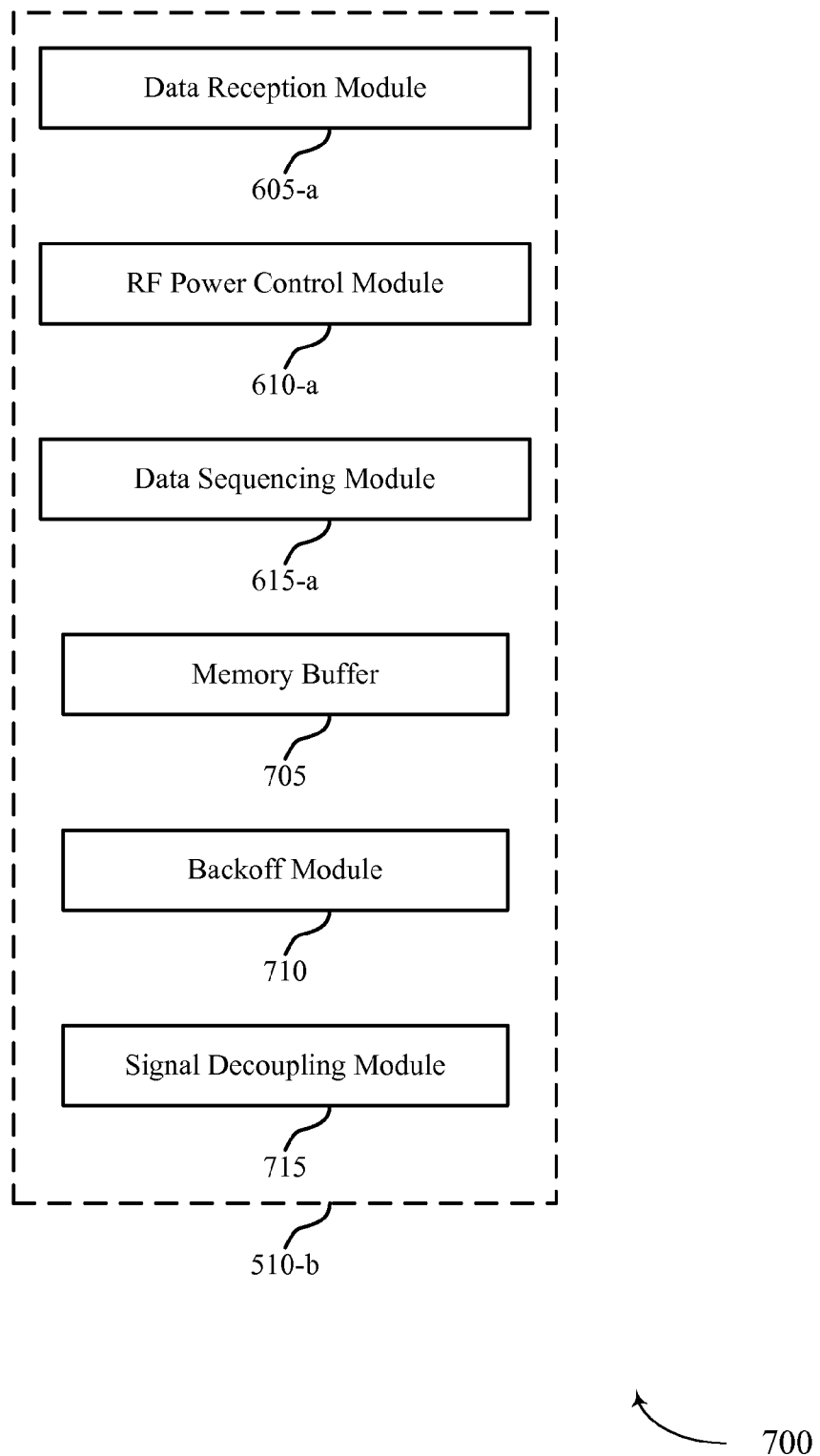
FIG. 7 shows a block diagram of a signal decoupling module configured for decoupling radio frequency and baseband processing in accordance with various aspects of the present disclosure.

FIG. 7 shows a block diagram 700 of a signal decoupling module 510-b for decoupling radio frequency and baseband processing in accordance with various aspects of the present disclosure. The signal decoupling module 510-b may be an example of aspects of a signal decoupling module 510 described with reference to FIGS. 5-6. The signal decoupling module 510-b may include a data reception module 605-a, a RF power control module 610-a, and a data sequencing module 615-a. Each of these modules may perform the functions described above with reference to FIG. 6. The signal decoupling module 510-b may also include a memory buffer 705, a backoff module 710, and a signal decoupling module 715.

The components of the signal decoupling module 510-b may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The memory buffer 705 may store the set of data blocks in a memory buffer as described above with reference to FIGS. 2-4. In some examples, storing the set of data blocks comprises storing a set of time domain samples or frequency tones corresponding to the set of data blocks in the memory buffer. In some cases, the memory buffer may be a component of an RF front end of the modem.

The backoff module 710 may send a message to a base station indicating a scheduling backoff period corresponding to the second interval as described above with reference to FIGS. 2-4. The signal decoupling module 715 may be configured such that the RF capacity of the modem may be based on wideband reception as described above with reference to FIGS. 2-4.

Figure 8:
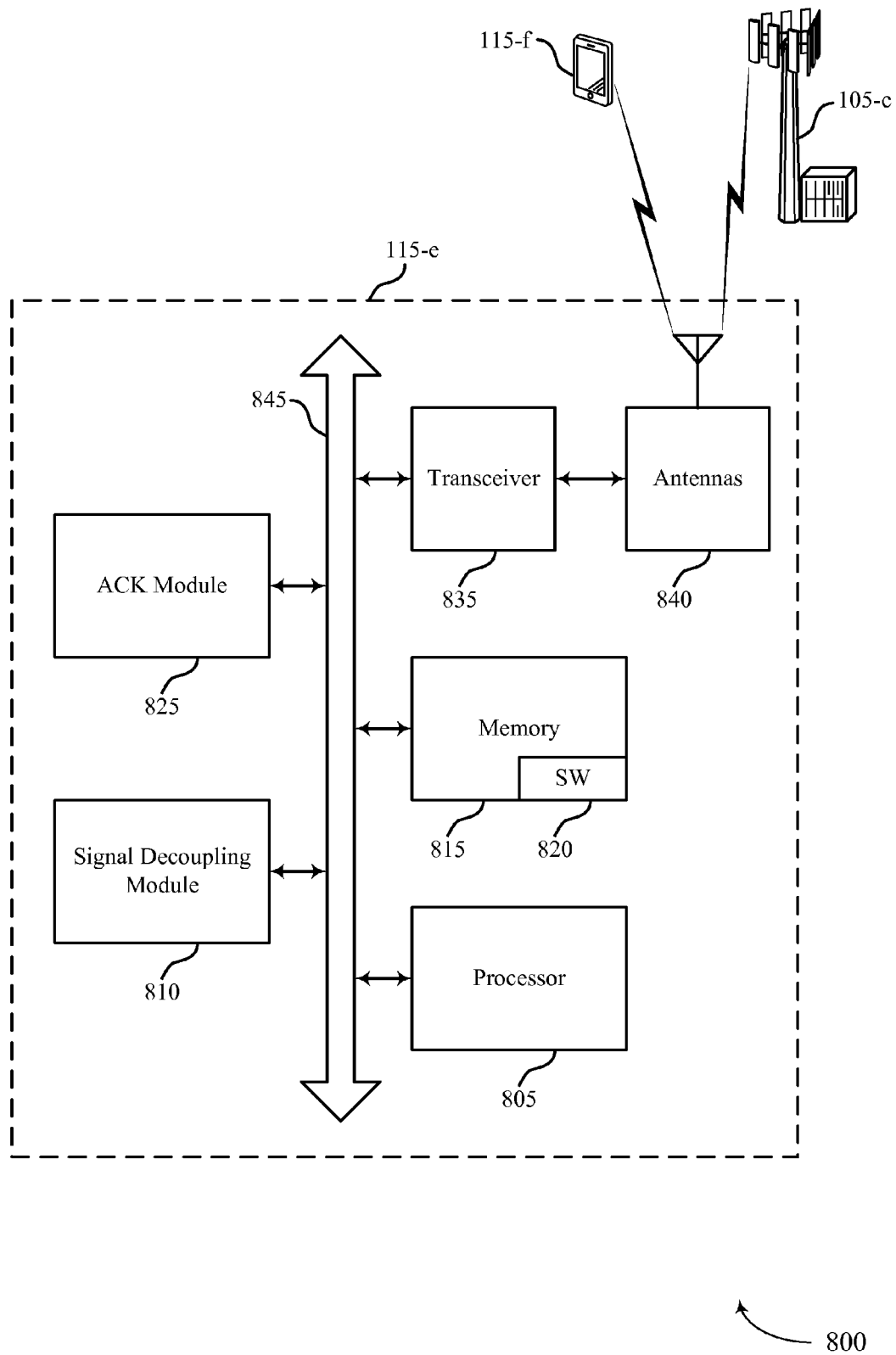
FIG. 8 illustrates a block diagram of a system including a UE configured for decoupling radio frequency and baseband processing in accordance with various aspects of the present disclosure.

FIG. 8 shows a diagram of a system 800 including a UE 115 configured for decoupling radio frequency and baseband processing in accordance with various aspects of the present disclosure. System 800 may include UE 115-e, which may be an example of a UE 115 described above with reference to FIGS. 1-7, and may be an example of a first device. UE 115-e may include a signal decoupling module 810, which may be an example of a signal decoupling module 510 described with reference to FIGS. 2-7. UE 115-e may also include an ACK module 825. UE 115-e may also include components for bi-directional voice and data communications including components for transmitting communications and components for receiving communications. For example, UE 115-e may communicate bi-directionally with base station 105-c or another UE 115-f, which may examples of a second device.

The ACK module 825 may determine whether to send an ACK for each data block. For example, ACK module 825 may refrain from sending an ACK to base station 105-c for a period corresponding to the second interval to prevent base station 105-c from sending new data blocks as described above with reference to FIGS. 2-4.

UE 115-e may also include a processor module 805, and memory 815 (including software (SW)) 820, a transceiver module 835, and one or more antenna(s) 840, each of which may communicate, directly or indirectly, with each other (e.g., via buses 845). The transceiver module 835 may include a modem and additional components for processing data as described above with reference to FIG. 3. The transceiver module may communicate bi-directionally, via the antenna(s) 840 or wired or wireless links, with one or more networks, as described above. For example, the transceiver module 835 may communicate bi-directionally with a base station 105 or another UE 115. The transceiver module 835 may include a modem to modulate the packets and provide the modulated packets to the antenna(s) 840 for transmission, and to demodulate packets received from the antenna(s) 840. While UE 115-e may include a single antenna 840, UE 115-e may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor module 805 to perform various functions described herein (e.g., decoupling radio frequency and baseband processing, etc.). Alternatively, the software/firmware code 820 may not be directly executable by the processor module 805 but cause a computer (e.g., when compiled and executed) to perform functions described herein. The processor module 805 may include an intelligent hardware device, (e.g., a central processing unit (CPU), a microcontroller, an ASIC, etc.)

Figure 9:
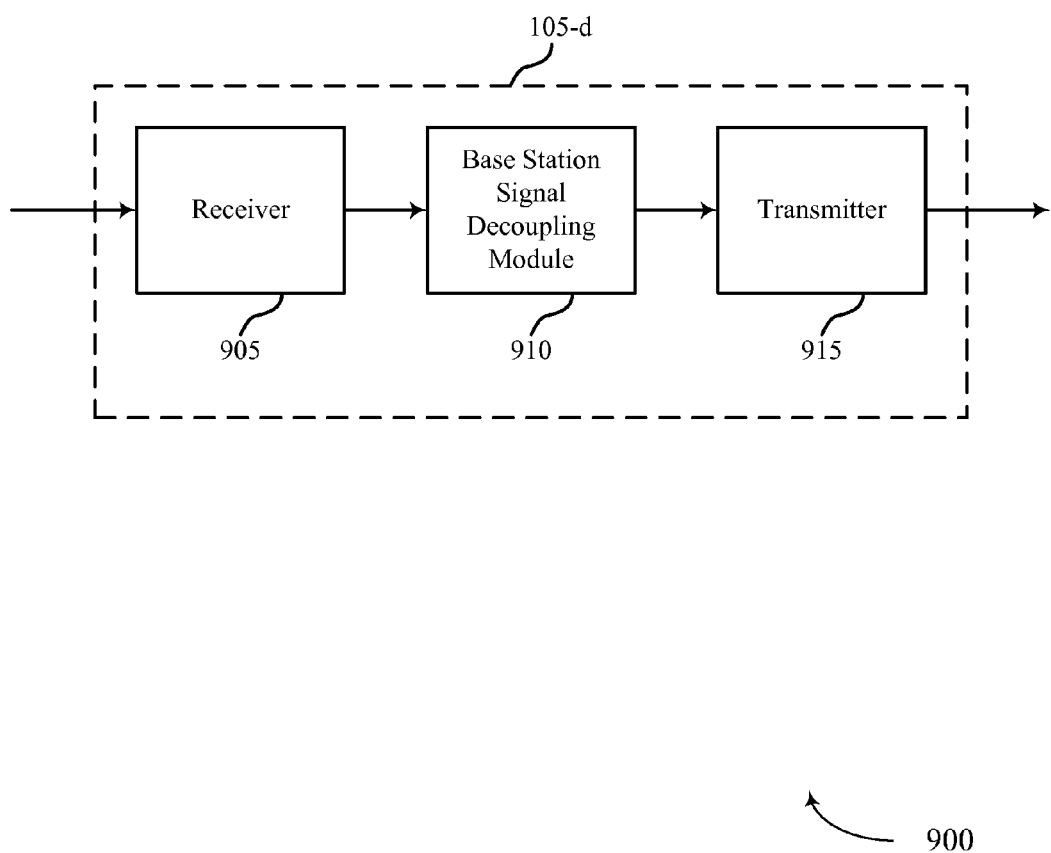
FIG. 9 shows a block diagram of a base station configured for decoupling radio frequency and baseband processing in accordance with various aspects of the present disclosure.

FIG. 9 shows a block diagram 900 of a base station 105-*d* configured for decoupling radio frequency and baseband processing in accordance with various aspects of the present disclosure. Base station 105-*d* may be an example of aspects of a base station 105 described with reference to FIGS. 1-8, and may be an example of a second device. Base station 105-*d* may include a receiver 905, a base station signal decoupling module 910, or a transmitter 915. Base station 105-*d* may also include a processor. Each of these components may be in communication with each other.

The components of base station 105-*d* may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The receiver 905 may receive information such as packets, user data, or control information associated with various information channels (e.g., control channels, data channels, and information related to decoupling radio frequency and baseband processing, etc.). Information may be passed on to the base station signal decoupling module 910, and to other components of base station 105-*d*. In some examples, the receiver 905 may receive a configuration message from the base station indicating the length of the second interval.

The base station signal decoupling module 910 may receive a message indicating a peak data rate and a sustained data rate of a UE, transmit a set of data blocks to the UE based on the peak data rate, determine a second interval based on one or more parameters including the peak data rate, the sustained data rate, or a memory buffer capacity, and refrain from transmitting to the UE during the second interval.

The transmitter 915 may transmit signals received from other components of base station 105-*d*. In some embodiments, the transmitter 915 may be collocated with the receiver 905 in a transceiver module. The transmitter 915 may include a single antenna, or it may include a plurality of antennas. In some examples, the transmitter 915 may refrain from transmitting to the UE during a low power processing interval.

Figure 10:
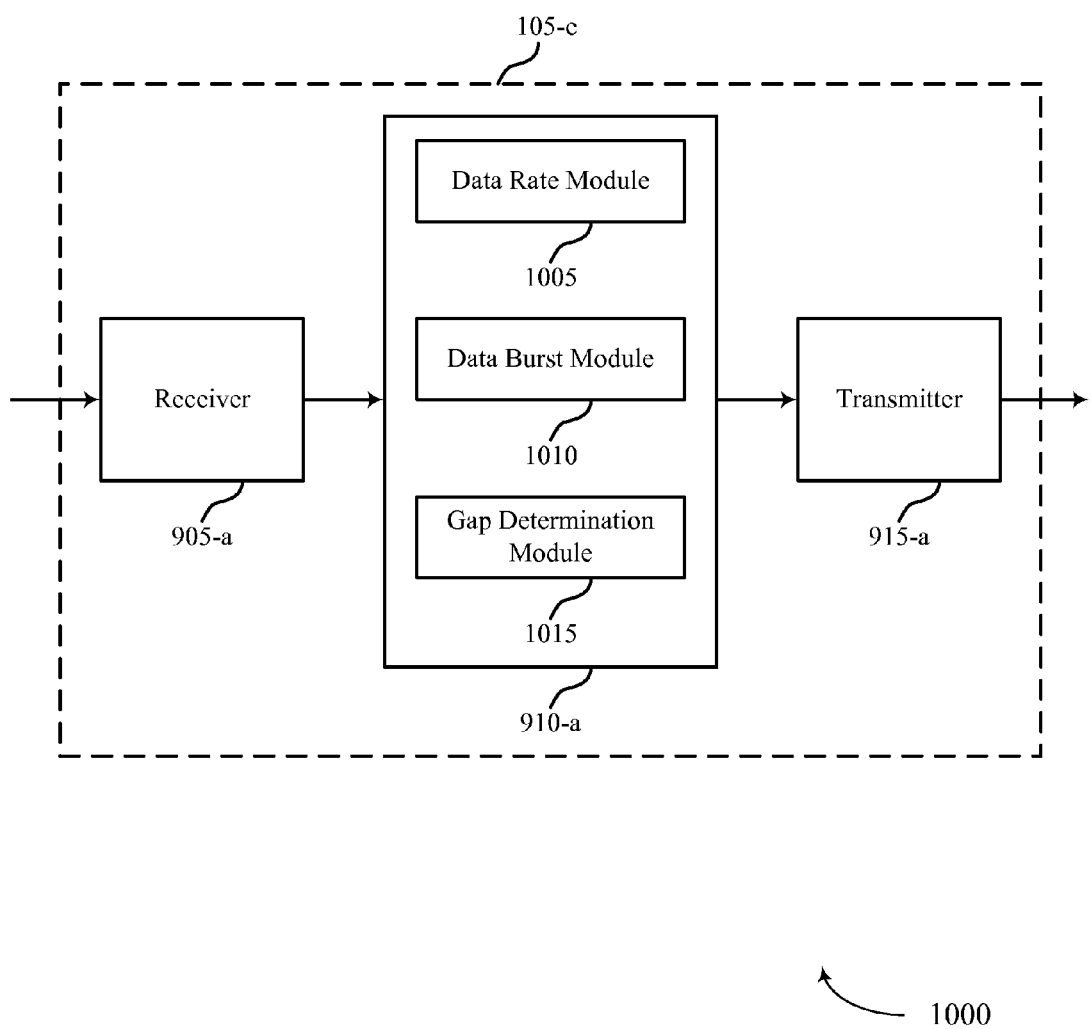
FIG. 10 shows a block diagram of a data burst module configured for decoupling radio frequency and baseband processing in accordance with various aspects of the present disclosure.

FIG. 10 shows a block diagram 1000 of a base station 105-*e* for decoupling radio frequency and baseband processing in accordance with various aspects of the present disclosure. Base station 105-*e* may be an example of aspects of a base station 105 described with reference to FIGS. 1-9, and may be an example of a second device. Base station 105-*e* may include a receiver 905-*a*, a base station signal decoupling module 910-*a*, or a transmitter 915-*a*. Base station 105-*e* may also include a processor. Each of these components may be in communication with each other. The base station signal decoupling module 910-*a* may also include a data rate module 1005, a data burst module 1010, and a gap determination module 1015.

The components of base station 105-*e* may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The receiver 905-*a* may receive information which may be passed on to the base station signal decoupling module 910-*a*, and to other components of base station 105-*e*. The base station signal decoupling module 910-*a* may perform the operations described above with reference to FIG. 9. The transmitter 915-*a* may transmit signals received from other components of base station 105-*e*.

The data rate module 1005 may receive a message indicating a peak data rate and a sustained data rate of a UE as described above with reference to FIGS. 2-4.

The data burst module 1010 may transmit a set of data blocks to the UE based on the peak data rate as described above with reference to FIGS. 2-4.

The gap determination module 1015 may determine a second interval based on one or more parameters including the peak data rate, the sustained data rate, or a memory buffer capacity as described above with reference to FIGS. 2-4. In some examples, calculating the length of the second interval comprises subtracting a length of the first interval from the product of the length of the first interval and the quotient of the peak data rate and the sustained data rate.

Figure 11:
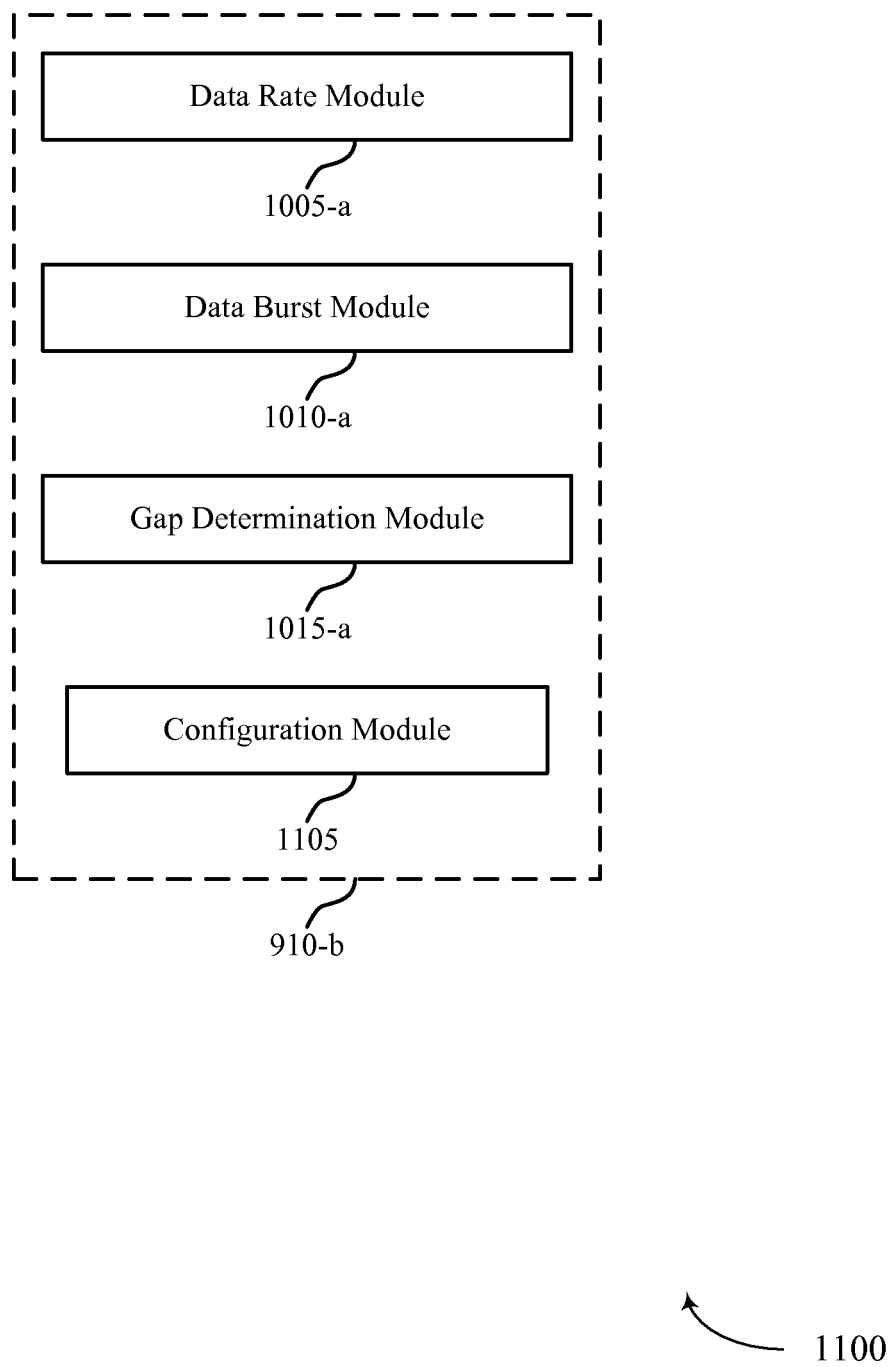
FIG. 11 shows a block diagram of a base station configured for decoupling radio frequency and baseband processing in accordance with various aspects of the present disclosure.

FIG. 11 shows a block diagram 1100 of a base station signal decoupling module 910-*b* for decoupling radio frequency and baseband processing in accordance with various aspects of the present disclosure. The base station signal decoupling module 910-*b* may be an example of aspects of a base station signal decoupling module 910 described with reference to FIGS. 9-10. The base station signal decoupling module 910-*b* may include a data rate module 1005-*a*, a data burst module 1010-*a*, and a gap determination module 1015-*a*. Each of these modules may perform the functions described above with reference to FIG. 10. The base station signal decoupling module 910-*b* may also include and a configuration module 1105.

The components of the base station signal decoupling module 910-*b* may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The configuration module 1105 may transmit a configuration message to the UE indicating the length of the second interval as described above with reference to FIGS. 2-4.

Figure 12:
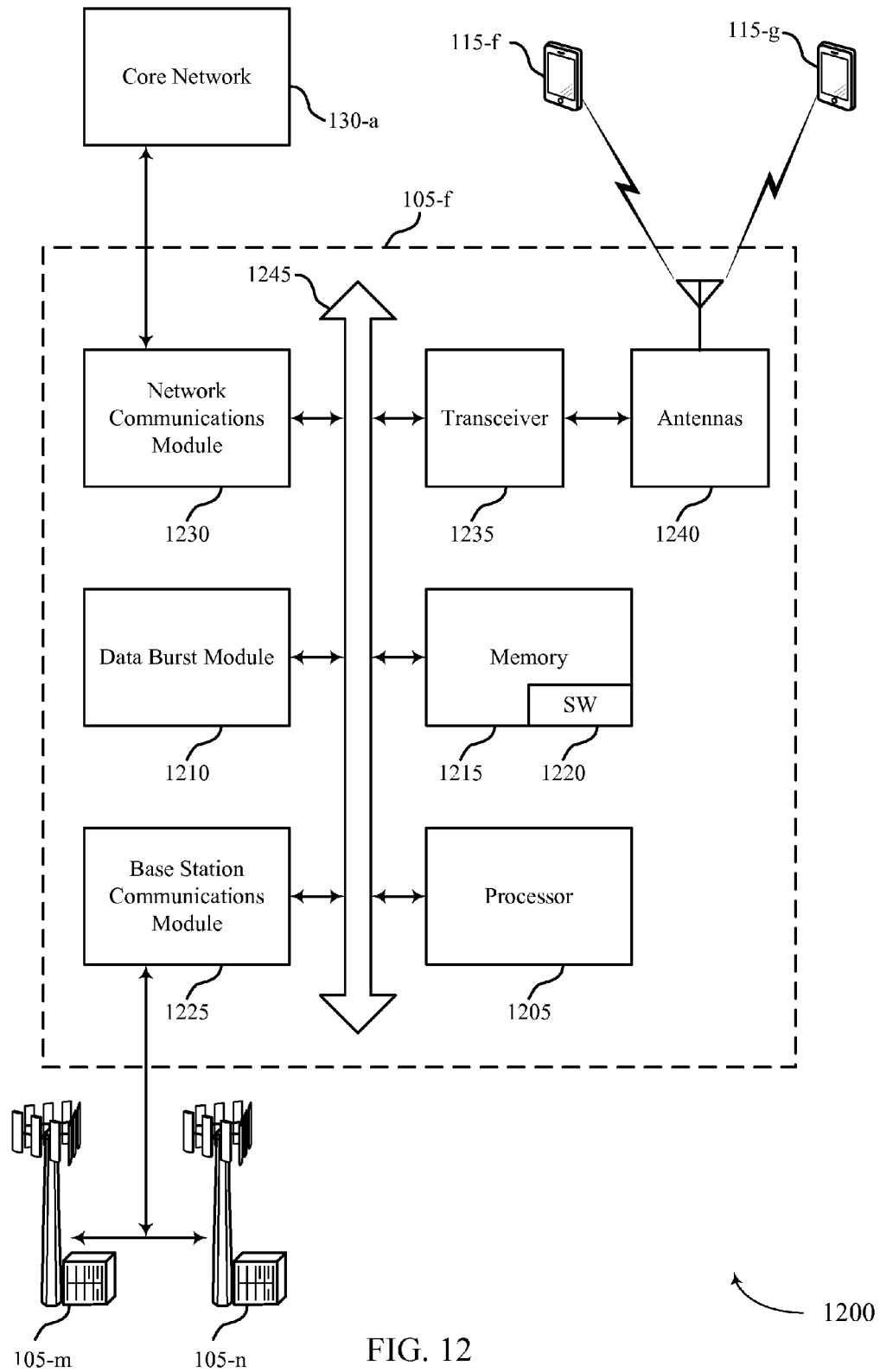
FIG. 12 illustrates a block diagram of a system including a base station configured for decoupling radio frequency and baseband processing in accordance with various aspects of the present disclosure.

FIG. 12 shows a diagram of a system 1200 including a base station 105 configured for decoupling radio frequency and baseband processing in accordance with various aspects of the present disclosure. System 1200 may include base station 105-*f*, which may be an example of a base station 105 described above with reference to FIGS. 1-11, and may be an example of a second device. Base Station 105-*f* may include a data burst module 1210, which may be an example of a base station signal decoupling module 910 described with reference to FIGS. 2-11. Base Station 105-*f* may also include components for bi-directional voice and data communications including components for transmitting communications and components for receiving communications. For example, base station 105-*f* may communicate bi-directionally with UE 115-*f* or a UE 115-*g* which may examples of a first device.

In some cases, base station 105-*f* may have one or more wired backhaul links. Base station 105-*f* may have a wired backhaul link (e.g., S1 interface, etc.) to the core network 130. Base station 105-*f* may also communicate with other base stations 105, such as base station 105-*m* and base station 105-*n* via inter-base station backhaul links (e.g., an X2 interface). Each of the base stations 105 may communicate with UEs 115 using the same or different wireless communications technologies. In some cases, base station 105-*f* may communicate with other base stations such as 105-*m* or 105-*n* utilizing base station communications module 1225. In some embodiments, base station communications module 1225 may provide an X2 interface within an LTE/LTE-A wireless communication network technology to provide communication between some of the base stations 105. In some embodiments, base station 105-*f* may communicate with other base stations through core network 130. In some cases, base station 105-*f* may communicate with the core network 130 through network communications module 1230.

The base station 105-*f* may include a processor module 1205, memory 1215 (including software (SW) 1220), transceiver modules 1235, and antenna(s) 1240, which each may be in communication, directly or indirectly, with each other (e.g., over bus system 1245). The transceiver modules 1235 may be configured to communicate bi-directionally, via the antenna(s) 1240, with the UEs 115, which may be multimode devices. The transceiver modules 1235 (or other components of base station 105-*f*) may also be configured to communicate bi-directionally, via the antennas 1240, with one or more other base stations (not shown). The transceiver modules 1235 may include a modem configured to modulate the packets and provide the modulated packets to the antennas 1240 for transmission, and to demodulate packets received from the antennas 1240. The base station 105-*f* may include multiple transceiver modules 1235, each with one or more associated antennas 1240. The transceiver module may be an example of a combined receiver 905 and transmitter 915 of FIG. 9.

The memory 1215 may include RAM and ROM. The memory 1215 may also store computer-readable, computer-executable software code 1220 containing instructions that are configured to, when executed, cause the processor module 1210 to perform various functions described herein (e.g., decoupling radio frequency and baseband processing, selecting coverage enhancement techniques, call processing, database management, message routing, etc.). Alternatively, the software 1220 may not be directly executable by the processor module 1205 but be configured to cause the computer, e.g., when compiled and executed, to perform functions described herein. The processor module 1205 may include an intelligent hardware device, e.g., a CPU, a microcontroller, an ASIC, etc. The processor module 1205 may include various special purpose processors such as encoders, queue processing modules, base band processors, radio head controllers, digital signal processor (DSPs), and the like.

The base station communications module 1225 may manage communications with other base stations 105. The communications management module may include a controller or scheduler for controlling communications with UEs 115 in cooperation with other base stations 105. For example, the base station communications module 1225 may coordinate scheduling for transmissions to UEs 115 for various interference mitigation techniques such as beamforming or joint transmission.

Figure 13:
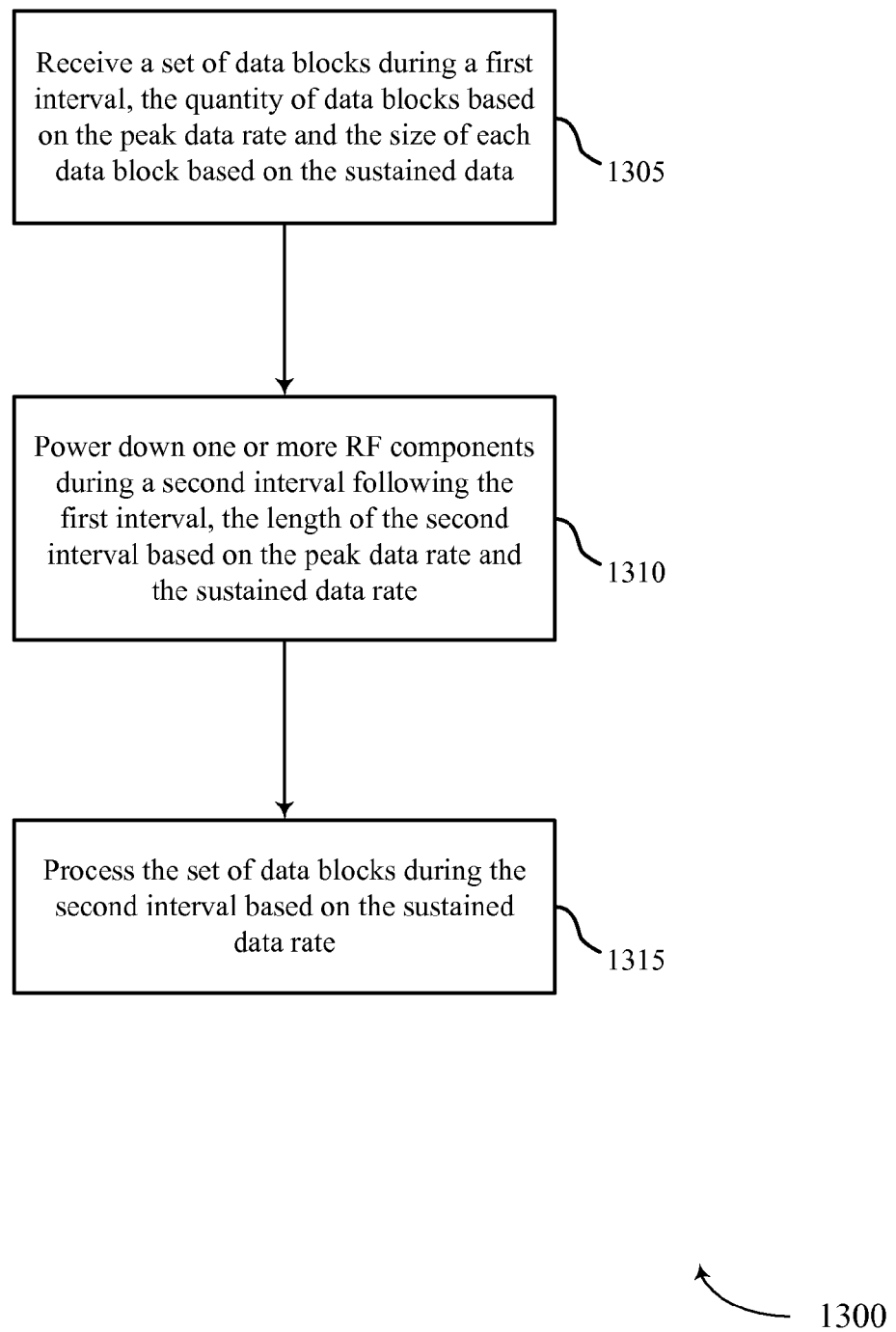
FIG. 13 shows a flowchart illustrating a method for decoupling radio frequency and baseband processing in accordance with various aspects of the present disclosure.

FIG. 13 shows a flowchart illustrating a method 1300 for decoupling radio frequency and baseband processing in accordance with various aspects of the present disclosure. The operations of method 1300 may be implemented by a UE 115 or its components as described with reference to FIGS. 1-12, which may be an example of a first device. For example, the operations of method 1300 may be performed by the signal decoupling module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware.

At block 1305, the UE 115 may receive a set of data blocks during a first interval, wherein a quantity of the set of data blocks is based on a peak data rate of a modem and a size of each data block in the set of data blocks is based on a sustained data rate of the modem as described above with reference to FIGS. 2-4. In certain examples, the operations of block 1305 may be performed by the data reception module 605 as described above with reference to FIG. 6.

At block 1310, the UE 115 may power down one or more RF components of the modem during a second interval following the first interval, wherein a length of the second interval is based on one or more parameters from a group consisting of the peak data rate, the sustained data rate, and a memory buffer capacity as described above with reference to FIGS. 2-4. In certain examples, the operations of block 1310 may be performed by the RF power control module 610 as described above with reference to FIG. 6.

At block 1315, the UE 115 may process the set of data blocks during the second interval based on the sustained data rate as described above with reference to FIGS. 2-4. In certain examples, the operations of block 1315 may be performed by the data sequencing module 615 as described above with reference to FIG. 6.

Figure 14:
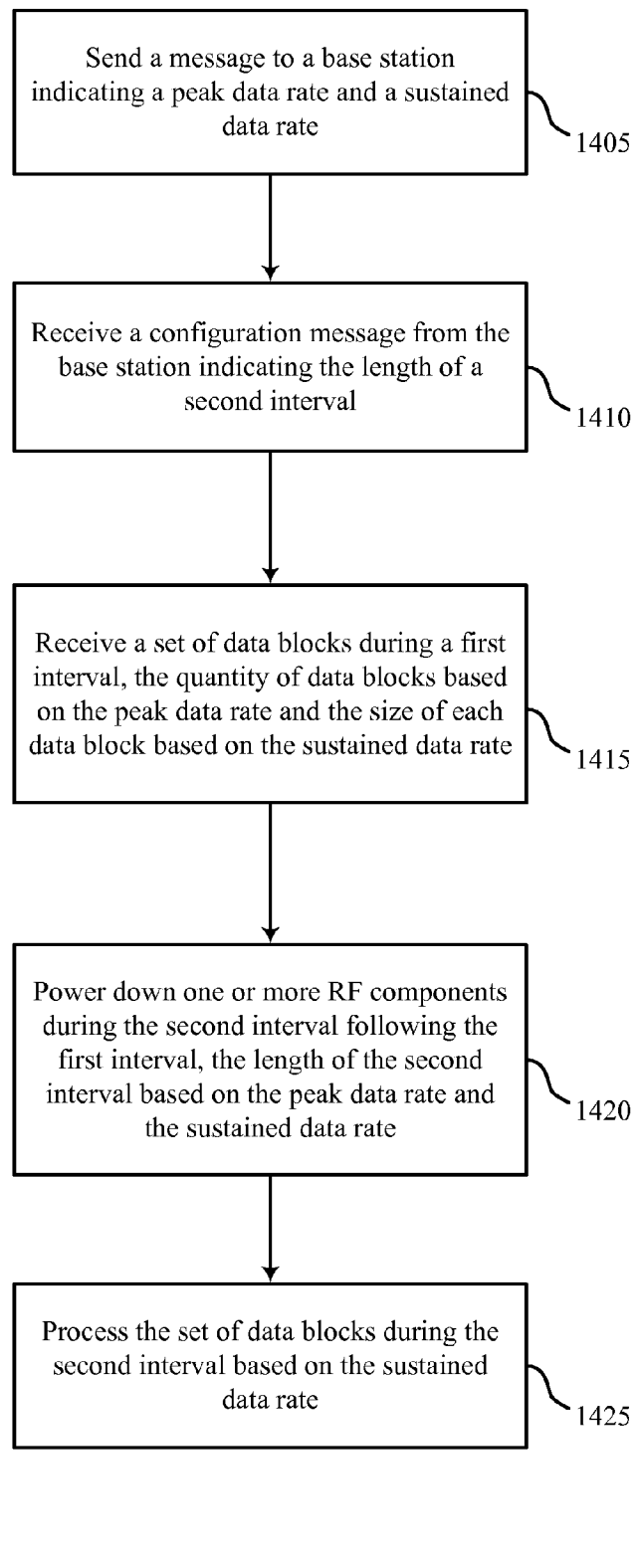
FIG. 14 shows a flowchart illustrating a method for decoupling radio frequency and baseband processing in accordance with various aspects of the present disclosure.

FIG. 14 shows a flowchart illustrating a method 1400 for decoupling radio frequency and baseband processing in accordance with various aspects of the present disclosure. The operations of method 1400 may be implemented by a UE 115 or its components as described with reference to FIGS. 1-12, which may be an example of a first device. For example, the operations of method 1400 may be performed by the signal decoupling module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1400 may also incorporate aspects of method 1300 of FIG. 13.

At block 1405, the UE 115 may send a message to a base station 105 indicating a peak data rate and a sustained data rate as described above with reference to FIGS. 2-4. In certain examples, the operations of block 1420 may be performed by the transmitter 515 as described above with reference to FIG. 5.

At block 1410, the UE 115 may receive a configuration message from the base station 105 indicating the length of a second interval as described above with reference to FIGS. 2-4. In certain examples, the operations of block 1425 may be performed by the receiver 505 as described above with reference to FIG. 5. In some cases, receiving the configuration message from the base station 105 may be optional. for example, the length of the second interval may be calculated by the UE 115.

At block 1415, the UE 115 may receive a set of data blocks during a first interval, wherein a quantity of the set of data blocks is based on the peak data rate of a modem and a size of each data block in the set of data blocks is based on the sustained data rate of the modem as described above with reference to FIGS. 2-4. In certain examples, the operations of block 1415 may be performed by the data reception module 605 as described above with reference to FIG. 6.

At block 1420, the UE 115 may power down one or more RF components of the modem during a second interval following the first interval, wherein a length of the second interval is based on one or more parameters from a group consisting of the peak data rate, the sustained data rate, and a memory buffer capacity as described above with reference to FIGS. 2-4. In certain examples, the operations of block 1420 may be performed by the RF power control module 610 as described above with reference to FIG. 6.

At block 1425, the UE 115 may process the set of data blocks during the second interval based on the sustained data rate as described above with reference to FIGS. 2-4. In certain examples, the operations of block 1425 may be performed by the data sequencing module 615 as described above with reference to FIG. 6.

Figure 15:
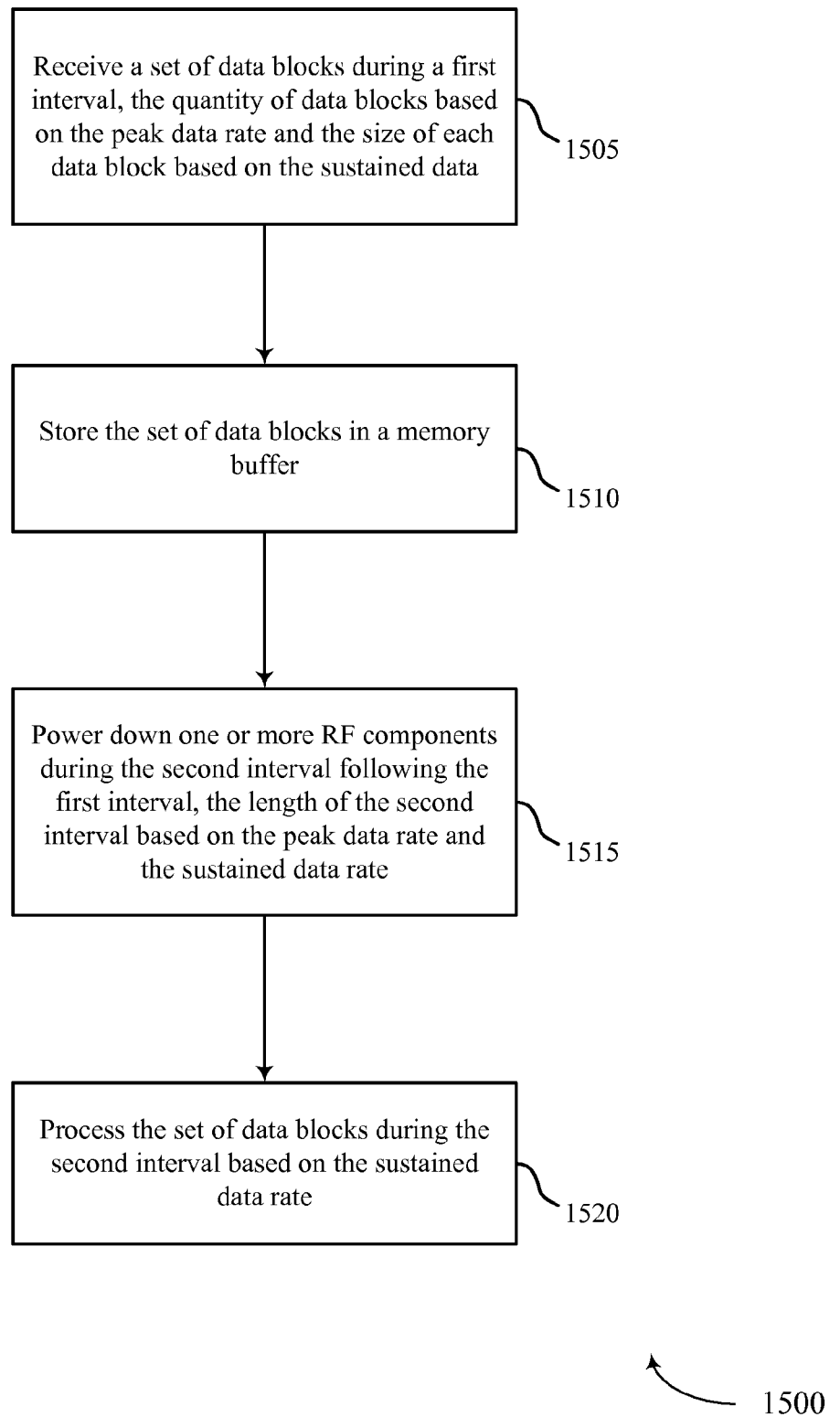
FIG. 15 shows a flowchart illustrating a method for decoupling radio frequency and baseband processing in accordance with various aspects of the present disclosure.

FIG. 15 shows a flowchart illustrating a method 1500 for decoupling radio frequency and baseband processing in accordance with various aspects of the present disclosure. The operations of method 1500 may be implemented by a UE 115 or its components as described with reference to FIGS. 1-12, which may be an example of a first device. For example, the operations of method 1500 may be performed by the signal decoupling module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1500 may also incorporate aspects of methods 1300, and 1400 of FIGS. 13-14.

At block 1505, the UE 115 may receive a set of data blocks during a first interval, wherein a quantity of the set of data blocks is based on a peak data rate of a modem and a size of each data block in the set of data blocks is based on a sustained data rate of the modem as described above with reference to FIGS. 2-4. In certain examples, the operations of block 1505 may be performed by the data reception module 605 as described above with reference to FIG. 6.

At block 1510, the UE 115 may store the set of data blocks in a memory buffer as described above with reference to FIGS. 2-4. In certain examples, the operations of block 1510 may be performed by the memory buffer 705 as described above with reference to FIG. 7.

At block 1515, the UE 115 may power down one or more RF components of the modem during a second interval following the first interval, wherein a length of the second interval is based on one or more parameters from a group consisting of the peak data rate, the sustained data rate, and a memory buffer capacity as described above with reference to FIGS. 2-4. In certain examples, the operations of block 1515 may be performed by the RF power control module 610 as described above with reference to FIG. 6.

At block 1520, the UE 115 may process the set of data blocks during the second interval based on the sustained data rate as described above with reference to FIGS. 2-4. In certain examples, the operations of block 1520 may be performed by the data sequencing module 615 as described above with reference to FIG. 6.

Figure 16:
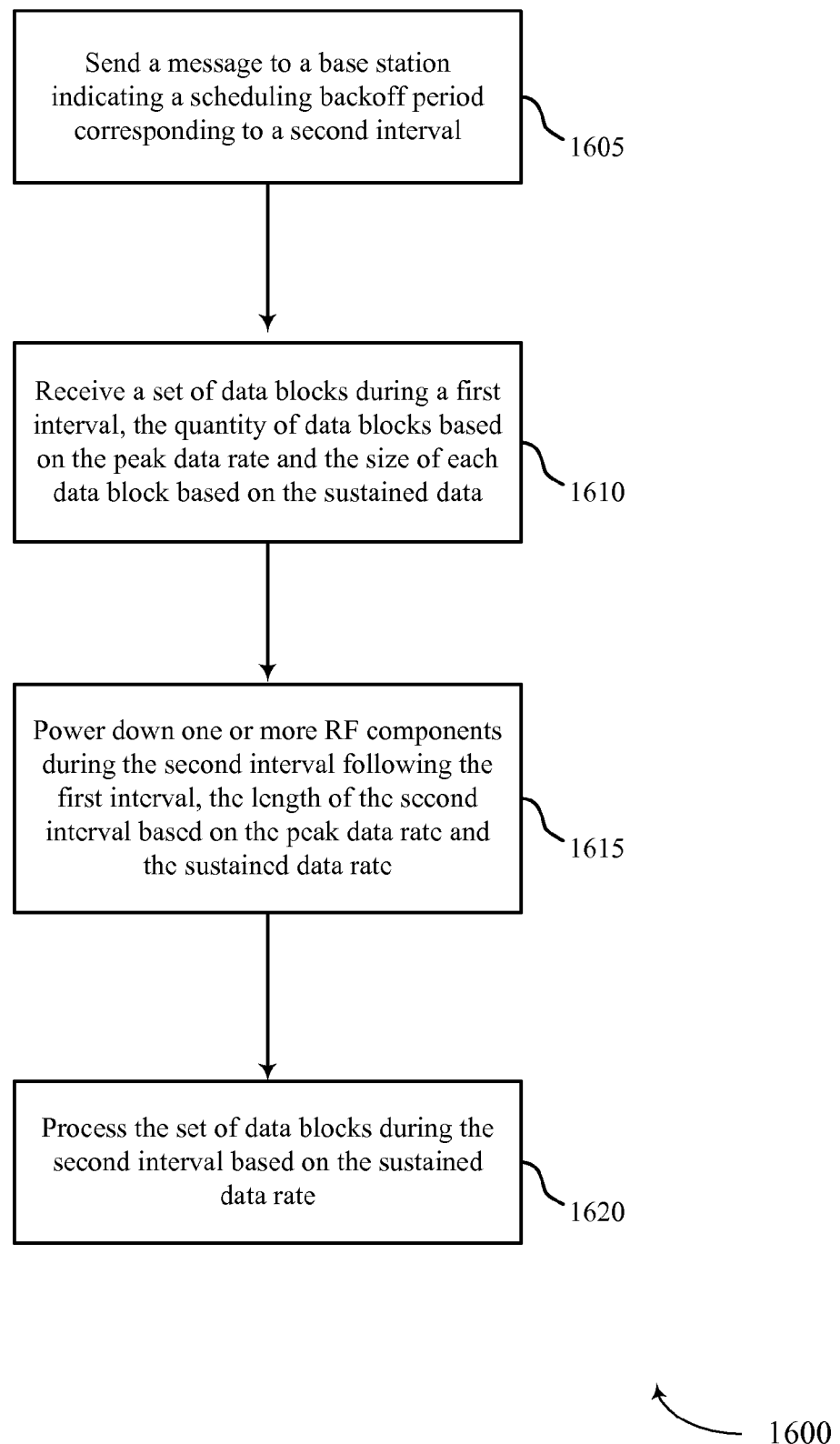
FIG. 16 shows a flowchart illustrating a method for decoupling radio frequency and baseband processing in accordance with various aspects of the present disclosure.

FIG. 16 shows a flowchart illustrating a method 1600 for decoupling radio frequency and baseband processing in accordance with various aspects of the present disclosure. The operations of method 1600 may be implemented by a UE 115 or its components as described with reference to FIGS. 1-12, which may be an example of a first device. For example, the operations of method 1600 may be performed by the signal decoupling module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1600 may also incorporate aspects of methods 1300, 1400, and 1500 of FIGS. 13-15.

At block 1605, the UE 115 may send a message to a base station indicating a scheduling backoff period corresponding to a second interval as described above with reference to FIGS. 2-4. In certain examples, the operations of block 1605 may be performed by the backoff module 710 as described above with reference to FIG. 7.

At block 1610, the UE 115 may receive a set of data blocks during a first interval, wherein a quantity of the set of data blocks is based on a peak data rate of a modem and a size of each data block in the set of data blocks is based on a sustained data rate of the modem as described above with reference to FIGS. 2-4. In certain examples, the operations of block 1610 may be performed by the data reception module 605 as described above with reference to FIG. 6.

At block 1615, the UE 115 may power down one or more RF components of the modem during the second interval following the first interval, wherein a length of the second interval is based on one or more parameters from a group consisting of the peak data rate, the sustained data rate, and a memory buffer capacity as described above with reference to FIGS. 2-4. In certain examples, the operations of block 1615 may be performed by the RF power control module 610 as described above with reference to FIG. 6.

At block 1620, the UE 115 may process the set of data blocks during the second interval based on the sustained data rate as described above with reference to FIGS. 2-4. In certain examples, the operations of block 1620 may be performed by the data sequencing module 615 as described above with reference to FIG. 6.

Figure 17:
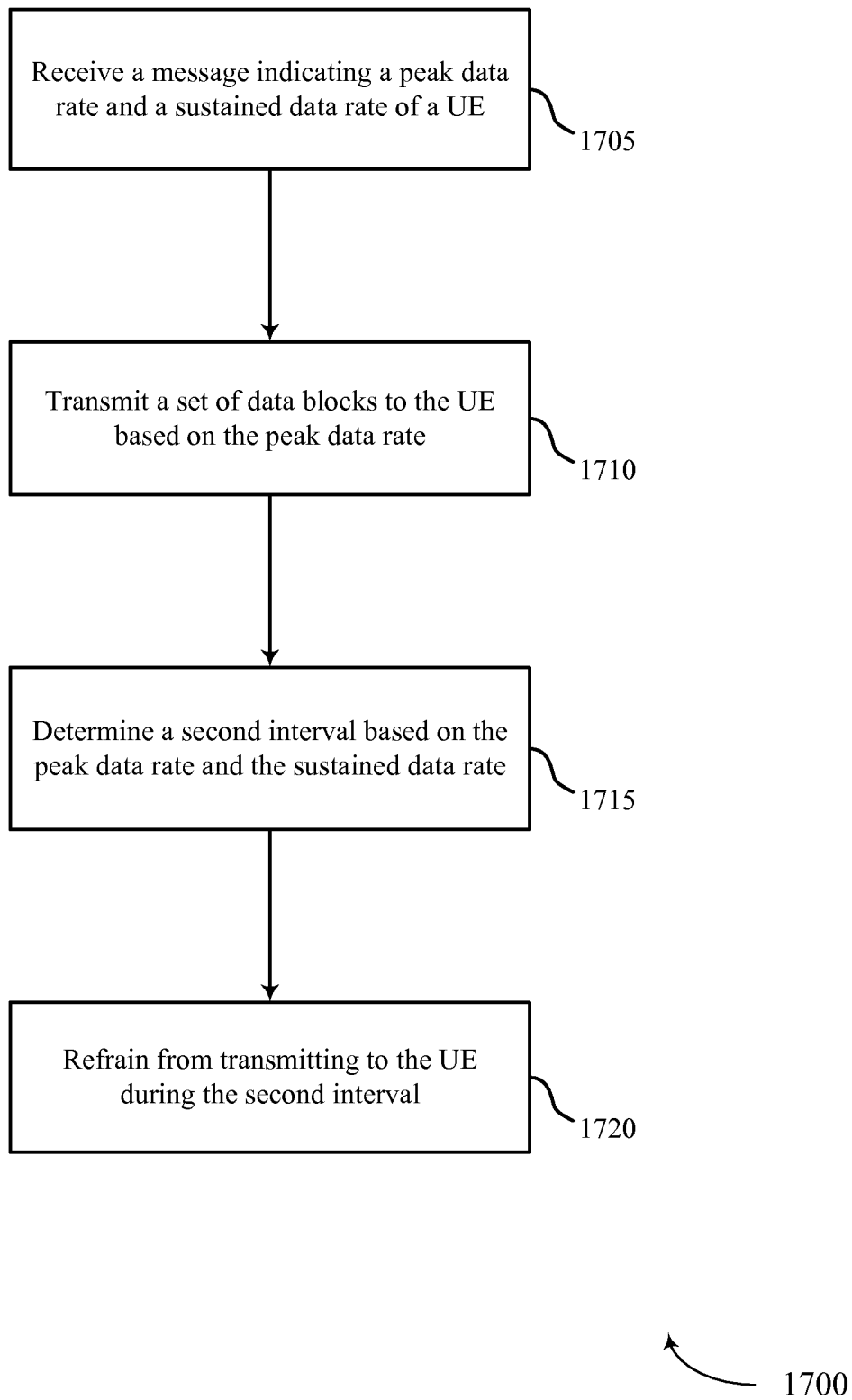
FIG. 17 shows a flowchart illustrating a method for decoupling radio frequency and baseband processing in accordance with various aspects of the present disclosure.

FIG. 17 shows a flowchart illustrating a method 1700 for decoupling radio frequency and baseband processing in accordance with various aspects of the present disclosure. The operations of method 1700 may be implemented by a base station 105 or its components as described with reference to FIGS. 1-12, which may be an example of a first device. For example, the operations of method 1700 may be performed by the base station signal decoupling module 910 as described with reference to FIGS. 9-12. In some examples, a UE 115 may execute a set of codes to control the functional elements of the UE 115 to perform the functions described below. Additionally or alternatively, the UE 115 may perform aspects the functions described below using special-purpose hardware. The method 1700 may also incorporate aspects of methods 1300, 1400, 1500, and 1600 of FIGS. 13-16.

At block 1705, the base station 105 may receive a message indicating a peak data rate and a sustained data rate of a UE as described above with reference to FIGS. 2-4. In certain examples, the operations of block 1705 may be performed by the data rate module 1005 as described above with reference to FIG. 1.

At block 1710, the base station 105 may transmit a set of data blocks to the UE based on the peak data rate as described above with reference to FIGS. 2-4. In certain examples, the operations of block 1710 may be performed by the data burst module 1010 as described above with reference to FIG. 1.

At block 1715, the base station 105 may determine a second interval based on one or more parameters from a group consisting of the peak data rate, the sustained data rate, and a memory buffer capacity as described above with reference to FIGS. 2-4. In certain examples, the operations of block 1715 may be performed by the gap determination module 1015 as described above with reference to FIG. 1.

At block 1720, the base station 105 may refrain from transmitting to the UE during the second interval as described above with reference to FIGS. 2-4. In certain examples, the operations of block 1720 may be performed by the transmitter 515 as described above with reference to FIG. 5.

Figure 18:
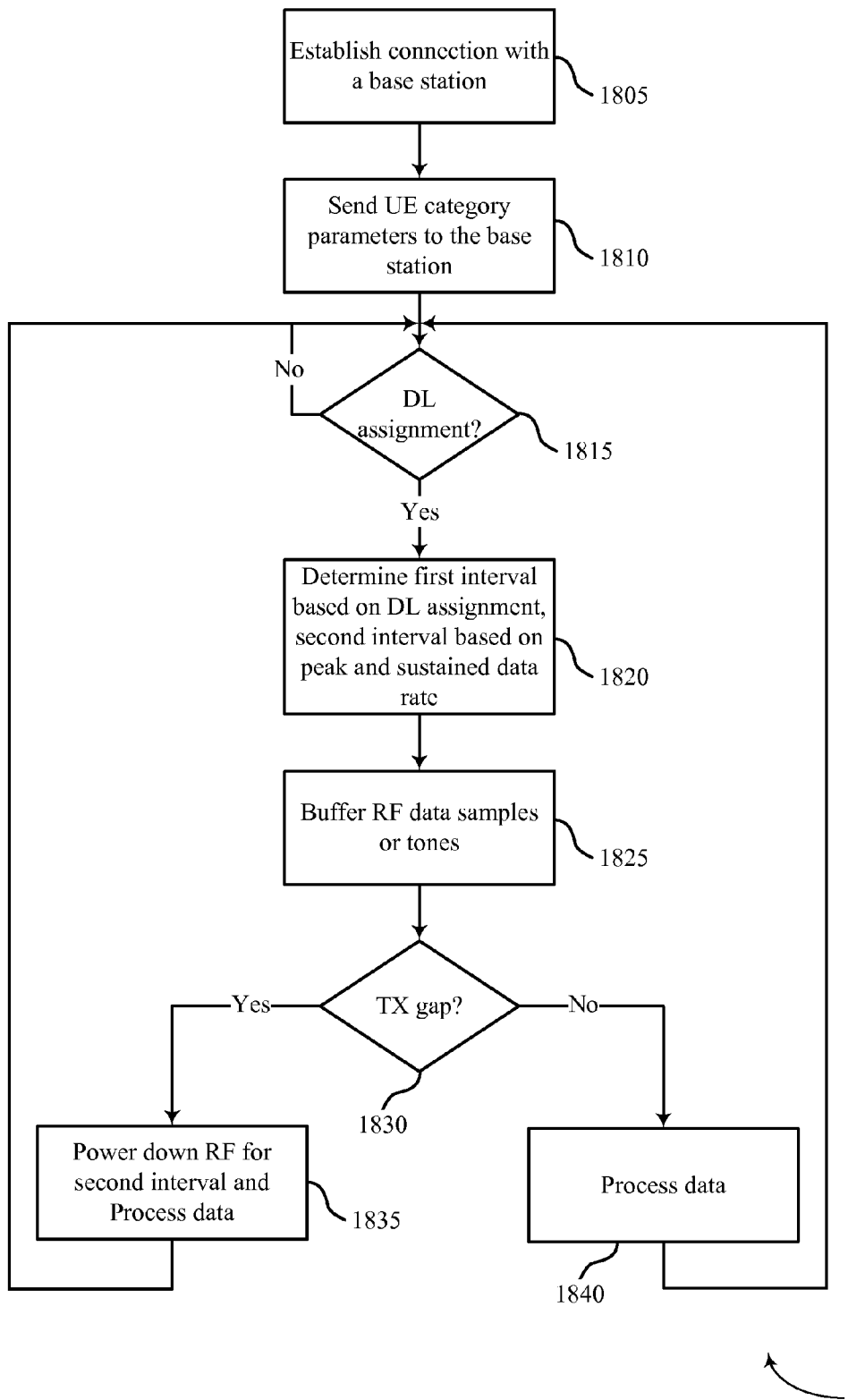
FIG. 18 shows a flowchart illustrating a method for decoupling radio frequency and baseband processing in accordance with various aspects of the present disclosure.

FIG. 18 shows a flowchart illustrating a method 1800 for decoupling radio frequency and baseband processing in accordance with various aspects of the present disclosure. The operations of method 1800 may be implemented by a UE 115 or its components as described with reference to FIGS. 1-12, which may be an example of a first device. For example, the operations of method 1800 may be performed by the signal decoupling module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1800 may also incorporate aspects of methods 1300, 1400, 1500, 1600 and 1700 of FIGS. 13-17.

At block 1805, the UE 115 may establish a connection with a base station 105. Then, at block 1810, the UE 115 may send a UE category indicating a peak data rate, a sustained data rate, or an RF buffer capacity to the base station 105.

At block 1815, the UE 115 may determine whether the base station 105 has indicated a DL assignment for the UE 115. If not, the UE 15 may wait for a DL assignment. At block 1820, if there is a DL assignment, the UE 115 may determine the first interval for receiving the DL assignment (e.g., based on a scheduling message from the base station 105). The UE 115 may also calculate a second interval for a transmission gap based on one or more parameters from a group consisting of the peak data rate (the actual peak data rate used for transmission and derived from the DL assignment), the sustained data rate, and a memory buffer capacity. In some cases, the UE 115 may receive an indication of the length of the second interval from the base station 105.

At block 1825, the UE 115 may buffer the data samples or frequency tones. Then, at block 1830, the UE 115 may determine whether there is a transmission gap during a second interval. If there is a transmission gap, the UE 115 may power down one or more RF components and process the data at block 1835. In some cases, the UE 115 may signal the end of the second interval (i.e., signal when it is ready to receive more data) to the base station 105. If there is no transmission gap, the UE 115 may simply process the data and keep the RF components powered for receiving more data.

Figure 19:
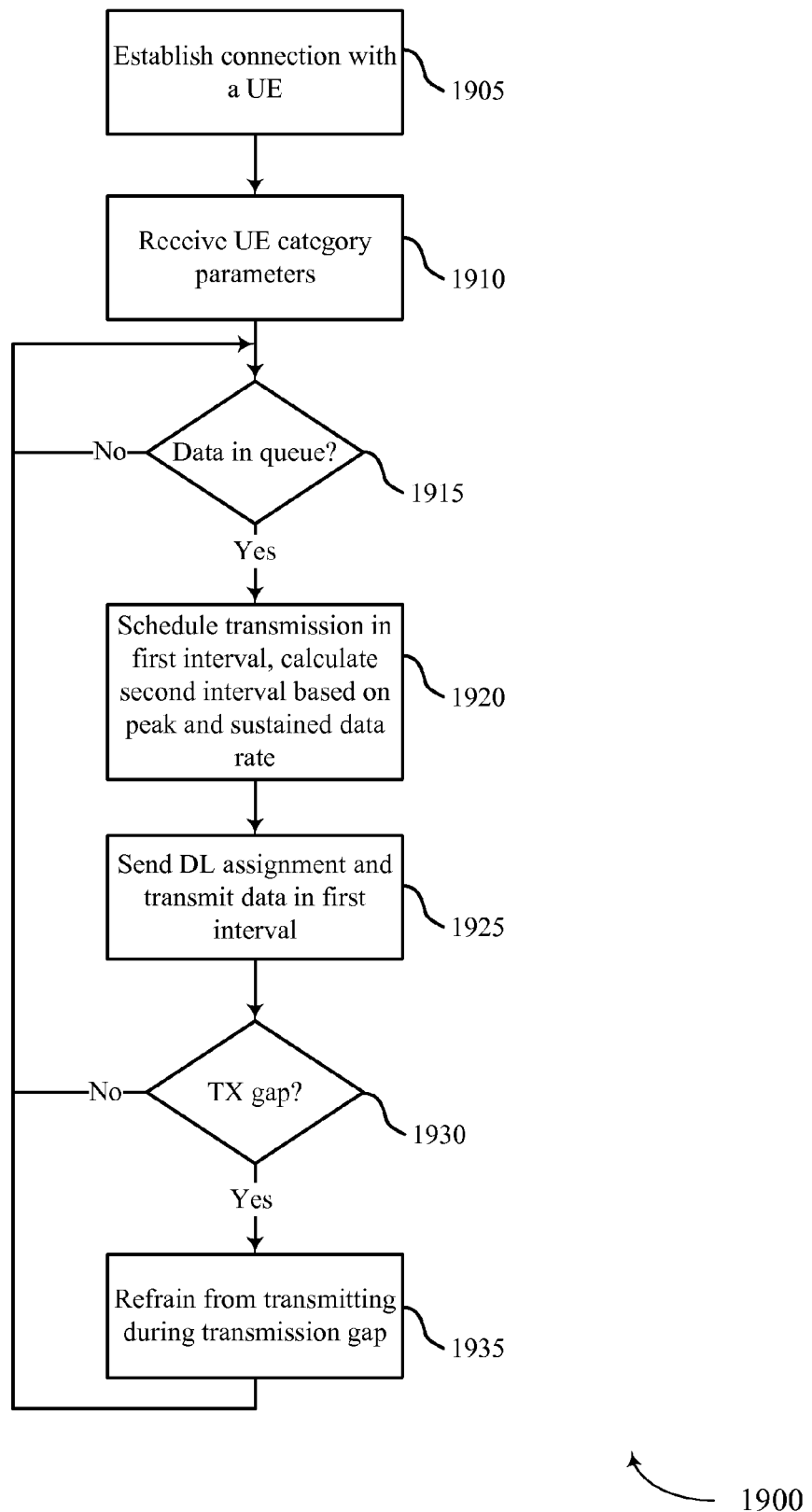
FIG. 19 shows a flowchart illustrating a method for decoupling radio frequency and baseband processing in accordance with various aspects of the present disclosure.

FIG. 19 shows a flowchart illustrating a method 1900 for decoupling radio frequency and baseband processing in accordance with various aspects of the present disclosure. The operations of method 1900 may be implemented by a base station 105 or its components as described with reference to FIGS. 1-12, which may be an example of a second device. For example, the operations of method 1900 may be performed by the base station signal decoupling module 910 as described with reference to FIGS. 9-12. In some examples, a UE 115 may execute a set of codes to control the functional elements of the UE 115 to perform the functions described below. Additionally or alternatively, the UE 115 may perform aspects the functions described below using special-purpose hardware. The method 1900 may also incorporate aspects of methods 1300, 1400, 1500, 1600, 1700, and 1800 of FIGS. 13-18.

At block 1905 the base station 105 may establish a connection with a UE 115, and at block 1910 the base station 105 may receive UE category parameters from UE 115 including a peak data rate and a sustained data rate.

At block 1915, the base station 105 may determine whether there is data in queue for the UE 115. If not, the base station 105 may wait for data to be queued. If there is data, at block 1920, the base station 105 may schedule a transmission for the data during a first interval and calculate a second interval for a transmission gap based on one or more parameters from a group consisting of the peak data rate (the actual peak data rate used for transmission and derived from the DL assignment), the sustained data rate, and a memory buffer capacity.

At block 1925, the base station may transmit the data to the UE during the first interval (e.g., over multiple carriers or over a single wideband carrier). In some cases, the base station may signal the length of the second interval to the UE 115. Then, at block 1930, the base station may determine whether to refrain from transmitting for the second interval. If not, the base station may proceed to determine whether there is additional data to transmit to the UE 115. If so, at block 1935, the base station 105 may refrain from allocating data or transmitting during the second interval, and then proceed to determine whether there is additional data to transmit to the UE 115. In some cases, the base station 105 can refrain from transmitting until it receives an explicit indication that the UE 115 is ready to receive more data (i.e., receive an indication of the end of the second interval from the UE 115).

Thus, methods 1300, 1400, 1500, 1600, 1700, 1800 and 1900 may provide for decoupling radio frequency and baseband processing. It should be noted that methods 1300, 1400, 1500, 1600, 1700, 1800 and 1900 describe possible implementation, and that the operations and the steps may be rearranged or otherwise modified such that other implementations are possible. In some examples, aspects from two or more of the methods 1300, 1400, 1500, 1600, 1700, 1800 and 1900 may be combined.

The detailed description set forth above in connection with the appended drawings describes exemplary embodiments and does not represent all the embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of [at least one of A, B, or C] means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable read only memory (EEPROM), compact disk (CD) ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication at a first device, comprising:
   receiving a set of data blocks during a first interval from a second device, wherein a quantity of the set of data blocks is based on a peak data rate of a modem and a size of each data block in the set of data blocks is based on a sustained data rate of the modem;
   powering down one or more radio frequency (RF) components of the modem during a second interval following the first interval, wherein a length of the second interval is based on one or more parameters from a group consisting of the peak data rate, the sustained data rate, and a memory buffer capacity; and
   processing the set of data blocks during the second interval based on the sustained data rate.

2. The method of claim 1, further comprising:
   storing the set of data blocks in a memory buffer, wherein storing the set of data blocks comprises storing a set of time domain samples or frequency tones corresponding to the set of data blocks in the memory buffer, wherein the memory buffer is a component of an RF front end of the modem, and wherein the memory buffer capacity is based on the memory buffer.

3. The method of claim 1, further comprising:
   storing the set of data blocks in a memory buffer; and
   wherein processing the set of data blocks during the second interval comprises retrieving each data block from the memory buffer according to an ordering of the set of data blocks and processing each data block from the set of data blocks in a baseband portion of the modem based on the ordering.

4. The method of claim 1, further comprising:
   sending a message to the second device indicating the one or more parameters.

5. The method of claim 4, further comprising:
   receiving a configuration message from the second device indicating the length of the second interval.

6. The method of claim 4, wherein sending the message to the second device comprises:
   indicating a UE category associated with the first device to the second device, wherein the UE category is associated with the one or more parameters.

7. The method of claim 1, further comprising:
   calculating the length of the second interval based on the one or more parameters.

8. The method of claim 1, further comprising:
   sending a message to the second device indicating a scheduling backoff period corresponding to the second interval.

9. The method of claim 1, wherein the peak data rate is based on an RF capacity of the modem.

10. A method of wireless communication at a second device, comprising:
    receiving a message indicating a peak data rate and a sustained data rate of a first device;
    transmitting a set of data blocks to the first device during a first interval based on the peak data rate;
    determining a second interval based on one or more parameters from a group consisting of the peak data rate, the sustained data rate, and a memory buffer capacity; and
    refraining from transmitting to the first device during the second interval.

11. The method of claim 10, further comprising:
    receiving a message from the first device indicating the one or more parameters.

12. The method of claim 11, further comprising:
    transmitting a configuration message to the first device indicating a length of the second interval.

13. The method of claim 11, further comprising:
    calculating a length of the second interval based on the one or more parameters.

14. The method of claim 10, further comprising:
    receiving a message from the first device indicating a scheduling backoff period corresponding to the second interval.

15. An apparatus for wireless communication at a first device, comprising:
    a processor;
    a memory coupled to the processor; wherein the processor is configured to:
      receive a set of data blocks during a first interval from a second device, wherein a quantity of the set of data blocks is based on a peak data rate of a modem and a size of each data block in the set of data blocks is based on a sustained data rate of the modem;
      power down one or more radio frequency (RF) components of the modem during a second interval following the first interval, wherein a length of the second interval is based on one or more parameters from a group consisting of the peak data rate, the sustained data rate, and a memory buffer capacity; and
      process the set of data blocks during the second interval based on the sustained data rate.

16. The apparatus of claim 15, wherein the processor is further configured to:
    store the set of data blocks in a memory buffer, wherein storing the set of data blocks comprises storing a set of time domain samples or frequency tones corresponding to the set of data blocks in the memory buffer, wherein the memory buffer is a component of an RF front end of the modem, and wherein the memory buffer capacity is based on the memory buffer.

17. The apparatus of claim 15, wherein the processor is further configured to:
    store the set of data blocks in a memory buffer; and
    wherein processing the set of data blocks during the second interval comprises retrieving each data block from the memory buffer according to an ordering of the set of data blocks and processing each data block from the set of data blocks in a baseband portion of the modem based on the ordering.

18. The apparatus of claim 15, wherein the processor is further configured to:
    send a message to the second device indicating the one or more parameters.

19. The apparatus of claim 18, wherein the processor is further configured to:
    receive a configuration message from the second device indicating the length of the second interval.

20. The apparatus of claim 18, wherein sending the message to the second device comprises:
    indicating a UE category to the second device, wherein the UE category is associated with the one or more parameters.

21. The apparatus of claim 15, wherein the processor is further configured to:
    calculate the length of the second interval based on the one or more parameters.

22. The apparatus of claim 15, wherein the processor is further configured to:

send a message to the second device indicating a scheduling backoff period corresponding to the second interval.

23. A non-transitory computer-readable medium for storing instructions executable by a processor, comprising:
    instructions to receive a set of data blocks during a first interval from a second device, wherein a quantity of the set of data blocks is based on a peak data rate of a modem and a size of each data block in the set of data blocks is based on a sustained data rate of the modem;
    instructions to power down one or more radio frequency (RF) components of the modem during a second interval following the first interval, wherein a length of the second interval is based on one or more parameters from a group consisting of the peak data rate, the sustained data rate, and a memory buffer capacity; and
    instructions to process the set of data blocks during the second interval based on the sustained data rate.

24. The non-transitory computer-readable medium of claim 23, wherein the instructions further comprise:
    instructions to store the set of data blocks in a memory buffer, wherein storing the set of data blocks comprises storing a set of time domain samples or frequency tones corresponding to the set of data blocks in the memory buffer, wherein the memory buffer is a component of an RF front end of the modem, and wherein the memory buffer capacity is based on the memory buffer.

25. The non-transitory computer-readable medium of claim 23, wherein the instructions further comprise:
    instructions to store the set of data blocks in a memory buffer; and
    wherein processing the set of data blocks during the second interval comprises retrieving each data block from the memory buffer according to an ordering of the set of data blocks and processing each data block from the set of data blocks in a baseband portion of the modem based on the ordering.

26. The non-transitory computer-readable medium of claim 23, wherein the instructions further comprise:
    instructions to send a message to the second device indicating the one or more parameters.

27. The non-transitory computer-readable medium of claim 26, wherein the instructions further comprise:
    instructions to receive a configuration message from the second device indicating the length of the second interval.

28. The non-transitory computer-readable medium of claim 26, wherein sending the message to the second device comprises:
    indicating a UE category to the second device, wherein the UE category is associated with the one or more parameters.

29. The non-transitory computer-readable medium of claim 23, wherein the instructions further comprise:
    instructions to calculate the length of the second interval based on the one or more parameters.

30. The non-transitory computer-readable medium of claim 23, wherein the instructions further comprise:
    instructions to send a message to the second device indicating a scheduling backoff period corresponding to the second interval.

* * * * *